(12) United States Patent
Yoshida

(10) Patent No.: US 12,164,279 B2
(45) Date of Patent: Dec. 10, 2024

(54) ESTIMATION APPARATUS, CONTROL SYSTEM, ESTIMATION METHOD, AND PROGRAM

(71) Applicant: NEC Corporation, Tokyo (JP)

(72) Inventor: Hiroshi Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 363 days.

(21) Appl. No.: 17/624,925

(22) PCT Filed: Jul. 16, 2019

(86) PCT No.: PCT/JP2019/027942
§ 371 (c)(1),
(2) Date: Jan. 5, 2022

(87) PCT Pub. No.: WO2021/009852
PCT Pub. Date: Jan. 21, 2021

(65) Prior Publication Data
US 2022/0269245 A1    Aug. 25, 2022

(51) Int. Cl.
*G05B 19/4155*    (2006.01)
(52) U.S. Cl.
CPC ............. *G05B 19/4155* (2013.01); *G05B 2219/41146* (2013.01)
(58) Field of Classification Search
CPC ...... G05B 19/4155; G05B 2219/41146; G05B 13/02; E02F 3/435; E02F 9/2054; E02F 9/267
See application file for complete search history.

(56) References Cited

U.S. PATENT DOCUMENTS

| | | | |
|---|---|---|---|
| 6,484,133 B1* | 11/2002 | Vogt | G05B 23/0232 702/182 |
| 2002/0010517 A1* | 1/2002 | Brown | G05B 13/026 700/274 |

(Continued)

FOREIGN PATENT DOCUMENTS

| | | |
|---|---|---|
| JP | H06-341848 A | 12/1994 |
| JP | H11-044754 A | 2/1999 |

(Continued)

OTHER PUBLICATIONS

International Search Report for PCT Application No. PCT/JP2019/027942, mailed on Oct. 15, 2019.

*Primary Examiner* — Christopher E. Everett
(74) *Attorney, Agent, or Firm* — Michael Dryja

(57) ABSTRACT

In order to provide an estimation apparatus estimating a true value from observation data without determining a state equation for a target to be controlled, the estimation apparatus includes a prediction section and an update section. The prediction section executes linear prediction on time-series data, which includes observation values acquired from a sensor attached to the target to be controlled, to calculate an estimate value before update relating to a state of the target to be controlled. The update section updates the estimate value before update by using the observation value acquired from the sensor. The prediction section may calculate the estimate value before update by weighted linear prediction on the time-series data of the observation values.

15 Claims, 15 Drawing Sheets

(56) References Cited

U.S. PATENT DOCUMENTS

| | | | | |
|---|---|---|---|---|
| 2008/0039957 A1* | 2/2008 | Hoseinnezhad | ...... | G05B 13/024 701/1 |
| 2009/0005886 A1* | 1/2009 | Gao | ...... | G05B 13/02 700/29 |
| 2013/0288572 A1* | 10/2013 | Benvegnu | ...... | B24B 37/013 451/5 |
| 2017/0307750 A1 | 10/2017 | Yokoyama et al. | | |
| 2019/0039643 A1* | 2/2019 | Oka | ...... | B62D 6/10 |

FOREIGN PATENT DOCUMENTS

| | | |
|---|---|---|
| JP | 2015-197403 A | 11/2015 |
| JP | 2016-045767 A | 4/2016 |
| WO | 2012/098968 A1 | 7/2012 |
| WO | 2016/098250 A1 | 6/2016 |

* cited by examiner ated Stage Entry of PCT/JP2019/
ESTIMATION APPARATUS, CONTROL SYSTEM, ESTIMATION METHOD, AND PROGRAM This application is a National Stage Entry of PCT/JP2019/027942 filed on Jul. 16, 2019, the contents of all of which are incorporated herein by reference, in their entirety.

BACKGROUND

Technical Field

The present invention relates to an estimation apparatus, a control system, an estimation method, and a program.

Background Art

In real-time control targeted to a robot, a construction machine, or the like, an actuator such as a motor is driven on the basis of observation data acquired from a sensor or the like (for example, an angle of an arm or an amount of displacement). Such control is referred as a feedback control.

On the observation data used for the feedback control (sensor data output by the sensor), noises are superimposed which are generated due to various factors such as vibrations and electromagnetic waves. When the actuator is driven on the basis of the observation data including such noises, an operation of a target to be controlled is diverged from an originally expected operation. That is, the observation data includes the noises generated due to various factors, and the noises cause control performance to decrease.

For this reason, "filtering" is necessary for canceling the noises from the observation data and estimating a true value. Such a filtering often adopts a Kalman filter. The Kalman filter is a scheme to estimate a state quantity on the basis of a motion equation (movement model) for the target to be controlled. It is known that the Kalman filter provides a good filtering in a linear system with Gaussian noises.

PTL 1 describes that a target tracking device is provided that precisely tracks a target even in a situation where a magnitude of an observation error changes depending on a state of motion of a moving object. PTL 2 describes that a navigation apparatus is provided that performs modeling specific to various kinds of sensors to properly and quickly estimate a sensor noise, and obtain high-accuracy positional information. PTL 1 and PTL 2 disclose the use of the Kalman filter.

CITATION LIST

Patent Literature

[PTL 1] JP 2015-197403 A
[PTL 2] JP H6-341848 A

SUMMARY

Technical Problem

As described above, in the filtering targeted to the linear system, the Kalman filter effectively acts. Here, the use of the Kalman filter as described in PTL 1 and PTL 2 necessarily needs to accurately model a target to be controlled such as a construction machine. That is, incorporation of the Kalman filter into a control system is based on an assumption that a state space model (state equation, motion equation) for a system targeted to be controlled is acquired in advance.

However, the state equation for the system targeted to be controlled is often difficult to determine in practice. For example, assuming a case that a construction machine is the system targeted to be controlled, an accurate state equation is not acquired unless an inertia moment, friction resistance, or the like of an arm is obtained. In other words, even if the state equation is calculated while parameters for acquiring the state equation are remained unclear, the calculated state equation greatly diverges from a real system.

The present invention has a primary example object to provide a control system, an estimation apparatus, an estimation method, and a program that contribute to estimating a true value from observation data without determining a state equation for a target to be controlled.

Solution to Problem

According to a first example aspect of the present invention, there is provided an estimation apparatus including a prediction section configured to execute linear prediction on time-series data, which includes observation values acquired from a sensor attached to a target to be controlled, to calculate an estimate value before update relating to a state of the target to be controlled, and an update section configured to update the estimate value before update by using an observation value acquired from the sensor.

According to a second example aspect of the present invention, there is provided a control system including means for controlling a sensor, means for calculating an estimate value before update relating to a state of a target to be controlled by executing linear prediction on time-series data, which includes observation values acquired from the sensor, means for updating the estimate value before update by using an observation value acquired from the sensor, and means for controlling an actuator by using the updated estimate value.

According to a third example aspect of the present invention, there is provided an estimation method in an estimation apparatus, the estimation method including calculating an estimate value before update relating to a state of a target to be controlled by executing linear prediction on time-series data, which includes observation values acquired from a sensor attached to the target to be controlled, and updating the estimate value before update by using an observation value acquired from the sensor.

According to a fourth example aspect of the present invention, there is provided a program causing a computer mounted on an estimation apparatus to execute processing of executing linear prediction on time-series data, which includes observation values acquired from a sensor attached to a target to be controlled, to calculate an estimate value before update relating to a state of the target to be controlled, and processing of updating the estimate value before update by using an observation value acquired from the sensor.

Advantageous Effects of Invention

According to each aspect of the present invention, an estimation apparatus, a control system, an estimation method, and a program are provided that contribute to estimating a true value from observation data without determining a state equation for a target to be controlled. Note that, according to the present invention, instead of or together with the above effects, other effects may be exerted.

DESCRIPTION OF THE EXAMPLE EMBODIMENTS

Figure 1:
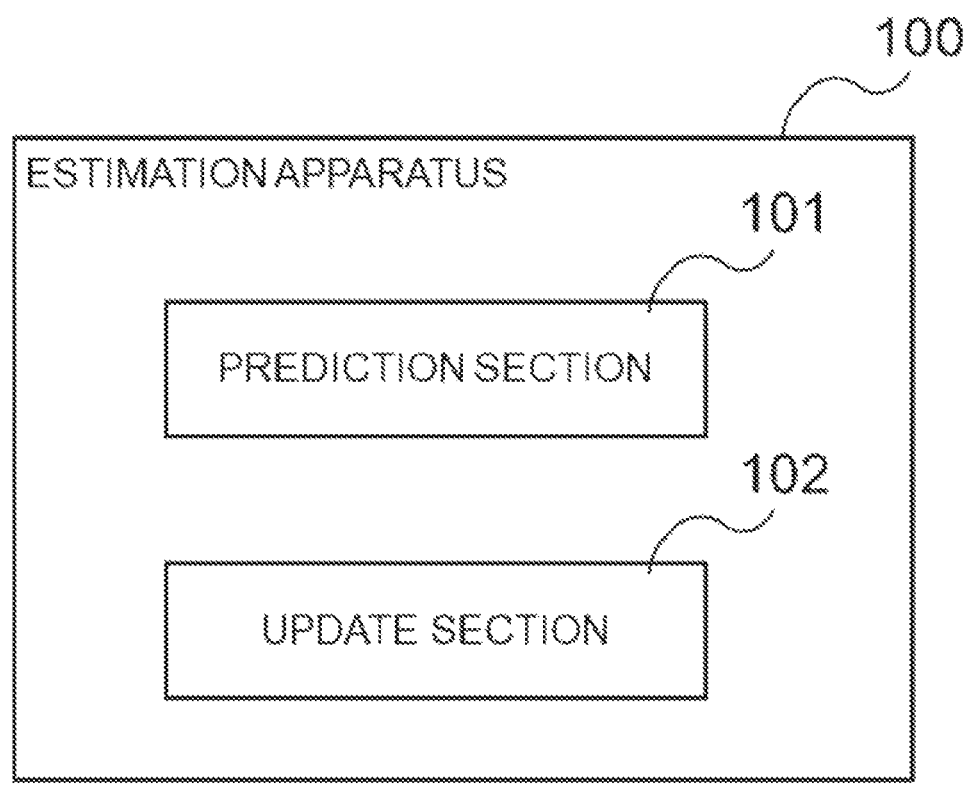
FIG. 1 is a diagram for describing an overview of an example embodiment.

First of all, an overview of an example embodiment will be described. Note that reference signs in the drawings provided in the overview are for the sake of convenience for each element as an example to promote better understanding, and description of the overview is not to impose any limitations. Note that, in the Specification and drawings, elements to which similar descriptions are applicable are denoted by the same reference signs, and overlapping descriptions may hence be omitted.

An estimation apparatus 100 according to an example embodiment includes a prediction section 101 and an update section 102 (see FIG. 1). The prediction section 101 executes linear prediction on time-series data, which includes observation values acquired from a sensor attached to a target to be controlled, to calculate an estimate value before update relating to a state of the target to be controlled. The update section 102 updates the estimate value before update by using the observation values acquired from the sensor.

The estimation apparatus 100 executes the linear prediction on the basis of a history of the observation data (time-series data) acquired in the past to implement a prediction step without using a state equation. For this reason, even if a complex state equation is not prepared in advance, filtering in accordance with a Kalman filter algorithm can be achieved.

Hereinafter, specific example embodiments are described in more detail with reference to the drawings.

First Example Embodiment

A first example embodiment will be described in further detail with reference to the drawings.

[System Configuration]

Figure 2:
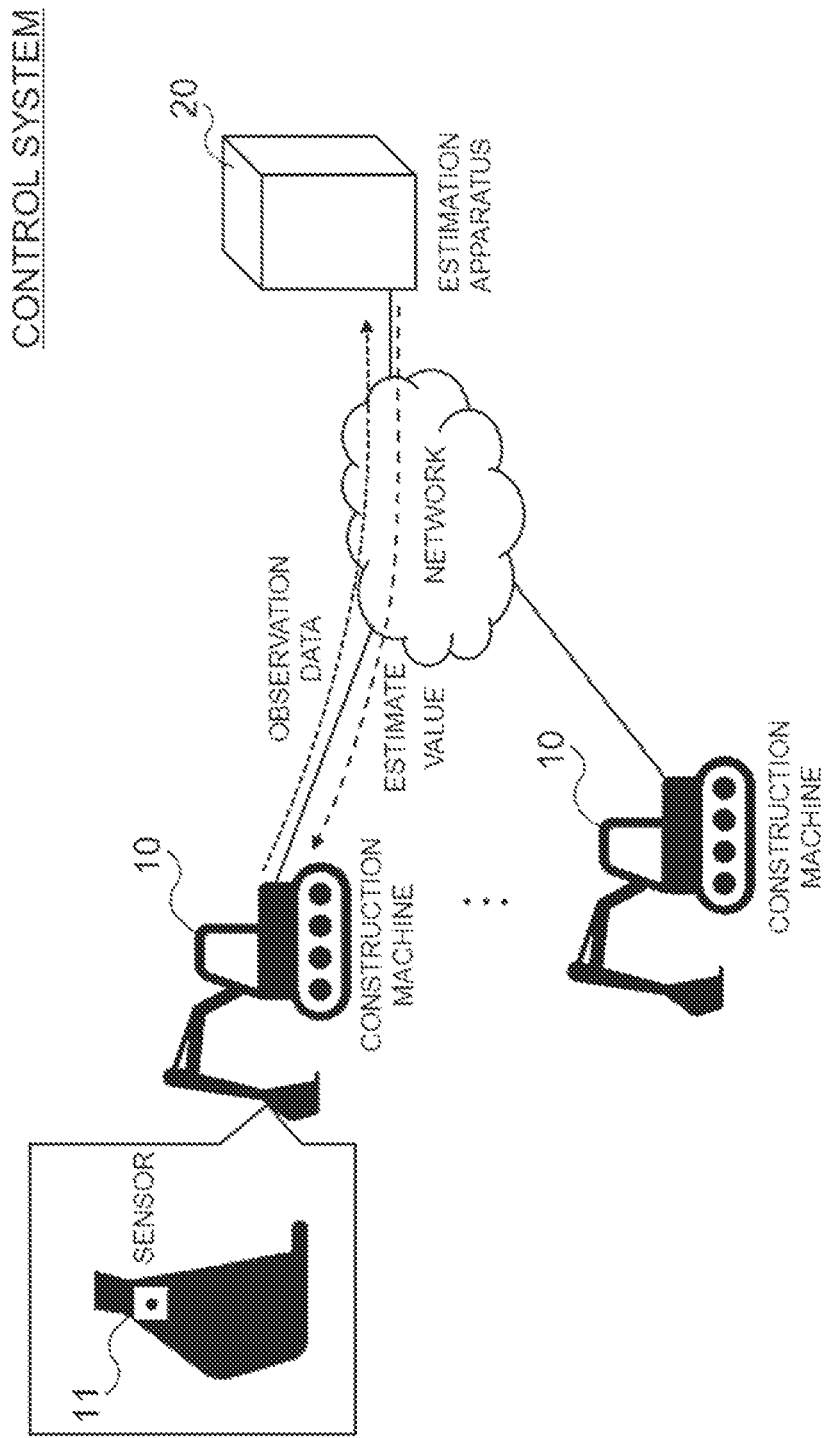
FIG. 2 is a diagram illustrating an example of a schematic configuration of a control system according to a first example embodiment.

FIG. 2 is a diagram illustrating an example of a schematic configuration of a control system according to the first example embodiment. With reference to FIG. 2, the control system includes a plurality of construction machines 10 and an estimation apparatus 20. Each of the plurality of construction machines 10 is connected to the estimation apparatus 20 via a wired network (for example, local area network (LAN), optical fiber, or the like), or a radio network (for example, long term evolution (LTE), WiFi (registered trademark) or local 5G).

Attached to each construction machine 10 is a sensor 11 for acquiring posture of the construction machine 10 or a state (position, angle) of an arm. In the example of FIG. 2, a tilt sensor for acquiring an angle of a bucket with respect to a surface of the earth is attached to the bucket.

The construction machine 10 transmits sensor data acquired from the sensor 11 as "observation data" to the estimation apparatus 20.

The estimation apparatus 20 cancels noises from the observation data acquired from the construction machine 10 to estimate a true value of a physical quantity that is targeted to be observed (sensed) by the sensor 11. The estimation apparatus 20 performs a filtering operation to calculate an estimate value of a likelihood true value from the observation data including the noises.

For example, as illustrated in FIG. 2, if the tilt sensor is attached to the bucket, the estimation apparatus 20 estimates a true value relating to the angle of the bucket with respect to the surface of the earth. The estimation apparatus 20 transmits the estimated true value to the construction machine 10.

The construction machine 10 controls an actuator such as a motor on the basis of the acquired estimate value. For example, the construction machine 10 performs feedback control or the like on the basis of the acquired estimate value to control such that the bucket tracks a target value.

Note that FIG. 2 is merely an example, and is not intended to limit the configuration of the system or the like. For example, it is only necessary that at least one or more construction machines 10 be included in the control system.

FIG. 2 illustrates a construction machine as the target to be controlled, but is not intended to limit the target to be controlled to the construction machine. For example, the target to be controlled according to the present application disclosure may be a robot or the like, and any target of which an operation is controlled by using a sensor or an actuator may be the target to be controlled.

Furthermore, FIG. 2 illustrates the tilt sensor attached to the bucket as an example of the sensor 11, but of course, is not intended to limit a type and attached position of the sensor 11, and the number of sensors 11. The sensor 11 suitable for the target to be controlled or a controlling intention is selected, and attached to the target to be controlled.

[Construction Machine]

Figure 3:
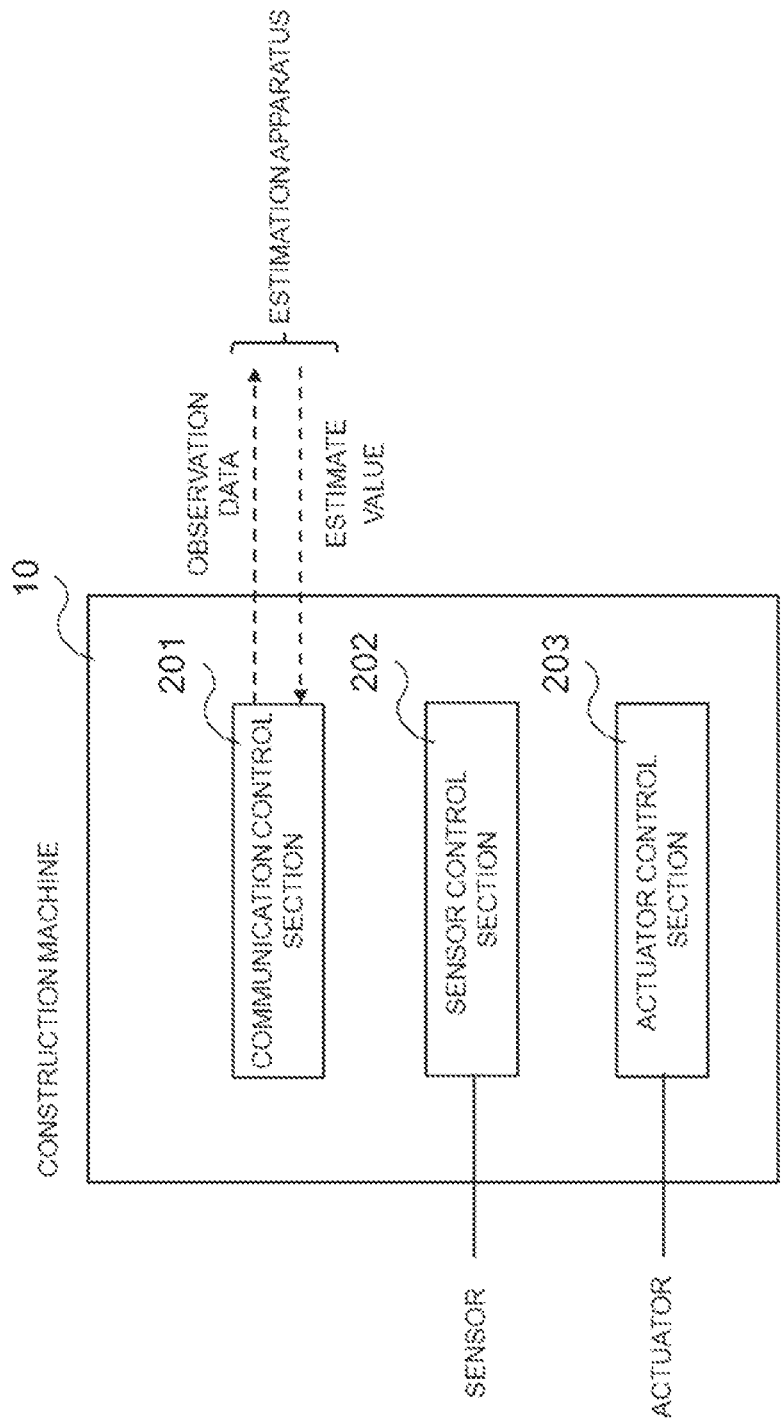
FIG. 3 is a diagram illustrating an example of a processing configuration of a construction machine according to the first example embodiment.

FIG. 3 is a diagram illustrating an example of a processing configuration (processing module) of the construction machine 10 according to the first example embodiment. With reference to FIG. 3, the construction machine 10 is configured to include a communication control section 201, a sensor control section 202, and an actuator control section 203.

The communication control section 201 is a means for controlling communication with another apparatus (for example, the estimation apparatus 20). The communication control section 201 transmits data (packet) acquired from another module to the estimation apparatus 20 on a network. Alternatively, the communication control section 201 distributes data acquired from another apparatus to another module.

The sensor control section 202 is a means for controlling the sensor 11 attached to the construction machine 10. The sensor control section 202 performs control on start and end of the sensor 11, and various configuration required for operations. The sensor control section 202 transmits data acquired from the sensor 11 (or transmits the observation data) to the estimation apparatus 20 via the communication control section 201.

The actuator control section 203 is a means for controlling an actuator such as motor. The actuator control section 203 controls the actuator on the basis of an estimate value (a true value of a physical quantity that is targeted to be sensed) acquired from the estimation apparatus 20 via the communication control section 201. For example, the actuator control section 203 determines an input to the actuator (for example, a voltage applied to the motor) such that the bucket tracks a target value for a trajectory of the bucket (target trajectory).

[Estimation Apparatus]

Figure 4:
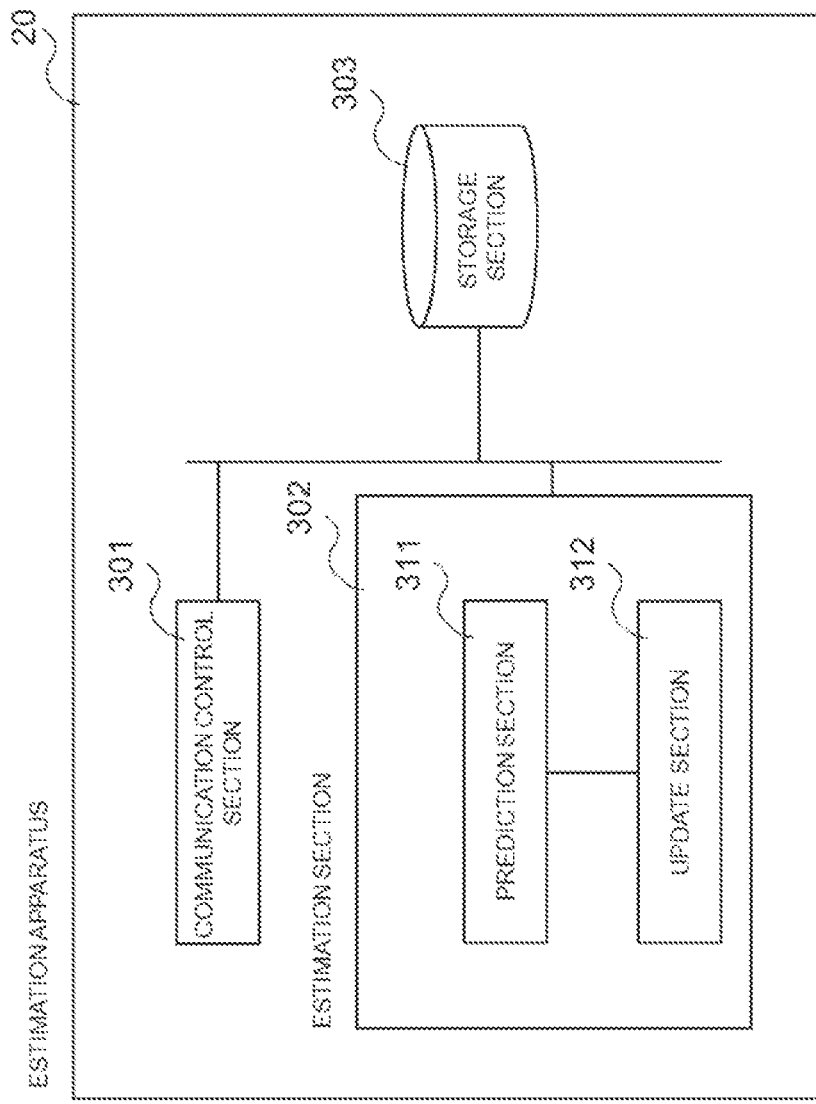
FIG. 4 is a diagram illustrating an example of a processing configuration of an estimation apparatus according to the first example embodiment.

FIG. 4 is a diagram illustrating an example of a processing configuration (processing module) of the estimation apparatus 20 according to the first example embodiment. With reference to FIG. 4, the estimation apparatus 20 is configured to include a communication control section 301, an estimation section 302, and a storage section 303.

The communication control section 301 is, similar to the communication control section 201 in the construction machine 10, a means for controlling communication with another apparatus (for example, the construction machine 10).

The storage section 303 is a means for storing information required for the operation of the estimation apparatus 20. For example, the storage section 303 stores the observation data (time-series of the observation data) acquired from the construction machine 10.

The estimation section 302 is a means for estimating a true value of a physical quantity that is targeted to be observed by the sensor 11. The estimation section 302, while taking a concept of the Kalman filter, estimates the true value of the physical quantity from the observation data without preparing a state equation required for using the Kalman filter in advance.

{Kalman Filter}

Before describing the estimation section 302 in detail, an existing Kalman filter (Kalman filter algorithm) is described. As described above, in using the Kalman filter, the target to be controlled is required to be defined in a state space representation (state space model, observation model).

The state space model (motion equation) is expressed as equation (1) below.

[Math. 1]

$$x_k = A x_{k-1} + B u_{k-1} + \omega_{k-1} \qquad (1)$$

In equation (1), x represents a state variable, u represents an input value, and ω represents a modeling error. The modeling error ω is expressed as a noise in accordance with a normal distribution N(0, Q). A represents a state matrix, and B represents an input matrix.

The observation model (observation equation) is expressed as equation (2) as below.

[Math. 2]

$$z_k = H x_k + v_k \qquad (2)$$

In equation (2), z represents an observation value and v represents an observation error. The observation error v is expressed as a noise in accordance with a normal distribution N(0, R). H represents an observation coefficient matrix (observation coefficient vector) indicating a relationship between the state variable and the observation value.

Equations (1) and (2) represent a discrete system, and a time is represented by a suffix of k.

The Kalman filter algorithm includes two steps (processes).

A first step is a prediction step (Time Update) of predicting a state in a current term (k) using a state in a previous term (k−1). In the prediction step, an estimate value before update (priori estimate value) and an error covariance before update (priori error covariance) are calculated.

A second step is an update step (Measurement Update) of updating the state in the current term by using the predicted state in the current term. In the update step, a Kalman gain, an estimate value after update (posteriori estimate value), and an error covariance after update (posteriori error covariance) are calculated.

In the prediction step, the estimate value before update and the error covariance before update are calculated using equations (3) and (4) below.

[Math. 3]

$$\hat{x}_k^- = A \hat{x}_{k-1} + B u_{k-1} \qquad (3)$$

[Math. 4]

$$P_k^- = A P_{k-1} A^T + Q \qquad (4)$$

Note that in the present application disclosure, T on the upper right of a matrix represents a transposed matrix.

In the update step, the Kalman gain is calculated using equation (5) below.

[Math. 5]

$$K_k = P_k^- H^T (H P_k^- H^T + R)^{-1} \qquad (5)$$

Furthermore, the estimate value after update and the error covariance after update are calculated in the update step, using equations (6) and (7) below.

[Math. 6]

$$\hat{x}_k = \hat{x}_k^- + K_k(z_k - H\hat{x}_k^-) \qquad (6)$$

[Math. 7]

$$P_k = (I - K^k H) P_k^- \qquad (7)$$

[Operation of Estimation Section]

The estimation section 302 includes two submodules of a prediction section 311 and an update section 312.

The prediction section 311 executes linear prediction on time-series data, which includes observation values acquired from the sensor attached to the target to be controlled (construction machine 10), to calculate the estimate value before update relating to the state of the target to be controlled. To be more specific, the prediction section 311, in place of calculating the estimate value before update using the state equation of the Kalman filter algorithm, calculates the estimate value before update by linear prediction on the time-series data of the observation values (observation data accumulated value; observation history). The prediction section 311 calculates the estimate value before update without using equation (1).

Here, the storage section 303 stores the observation data until n terms before the current term (n is a positive integer, which applies to the following). For example, the storage section 303 stores the time-series data indicating temporal changes in the observation values acquired from the construction machine 10. The observation data stored in the storage section 303 can be expressed as equation (8) below.

[Math. 8]

$$\{z_k\}(k = t-n, t-n+1, \ldots, t-1) \qquad (8)$$

The prediction section 311 executes linear prediction on the observation data (time-series data of the observation values) to predict the state in the current term (or calculate the estimate value before update). For example, the prediction section 311 calculates the estimate value before update by weighted linear prediction. Specifically, the prediction section 311 calculates the estimate value before update in the current term using equation (9) below.

[Math. 9]

$$\hat{x}_{\overline{k}} = \left(\overline{z} - \frac{s_{zk}}{s_{zz}}\overline{k}\right) + \frac{s_{zk}}{s_{zz}} t \qquad (9)$$

Parameters described in equation (9) are calculated by equations (10) to (13) below.

[Math. 10]

$$\overline{z} = \frac{\sum w_k z_k}{\sum w_k} \qquad (10)$$

[Math. 11]

$$\overline{k} = \frac{\sum w_k k}{\sum w_k} \qquad (11)$$

[Math. 12]

$$s_{zz} = \sum w_k (z_k - \overline{z})^2 \qquad (12)$$

[Math. 13]

$$s_{zk} = \sum w_k (z_k - \overline{z})(k - \overline{k}) \qquad (13)$$

The weights used in equations (10) to (13) can be defined as equation (14) below.

[Math. 14]

$$w_k = n + k - t + 1 \qquad (14)$$

As expressed by equation (14), the closer to the current term the observation data is, the larger k indicating the time. For this reason, the later the time, the larger values set to the weights expressed by equation (14). That is, the prediction section 311 uses the weights that are larger as the time is closer to the current term to execute the weighted linear prediction.

The prediction section 311 calculates a weighted mean (weighted average) of the observation values by using equation (10), and calculates a weighted average for the time when each piece of the observation data is observed by using equation (11).

The prediction section 311 calculates a weighted residual sum of squares for the observation data by using equation (12), and calculates a weighted residual sum of squares for the time when each piece of the observation data is observed by using equation (13).

The prediction section 311 uses a calculation result by equation (9) as the estimate value before update calculated in the prediction step in the Kalman filter algorithm.

As described above, the prediction section 311 is a module to perform processing corresponding to the prediction step in the Kalman filter algorithm. Thus, the prediction section 311 calculates the error covariance before update, similar to the Kalman filter algorithm.

Specifically, the prediction section 311 calculates the error covariance before update using equation (4) described above. However, the prediction section 311 calculates the error covariance before update using an identity matrix I as the state matrix A in equation (4). Note that using the identity matrix I as the state matrix A is reasonable in a case that the operation has a certain linearity like the bucket of the construction machine 10.

The prediction section 311 performs the calculation using a predetermined value (fixed value) as the variance value Q in equation (4). The variance value Q is determined by a system administrator or like after making an estimate of variations in the modeling error in advance.

The prediction section 311 delivers the calculated estimate value before update and error covariance before update to the update section 312.

The update section 312 updates the estimate value before update by using the observation values acquired from the sensor 11. To be more specific, the update section 312 performs the update step in the Kalman filter algorithm. The update section 312 uses the estimate value before update and error covariance before update acquired from the prediction section 311 to calculate the Kalman gain, the estimate value after update, and the error covariance after update by using equations (5) to (7).

Note that in a case that the observation data and the state variable are the same types of signals as is in the construction machine 10 that is the target to be controlled for the control system according to the first example embodiment, the observation coefficient matrix H can be set to the identity matrix I. Thus, in the present application disclosure, the observation coefficient matrix H is handled as the identity matrix I.

When terminating the update processing by the update section 312 (processing of correcting the estimate value before update acquired in the prediction step on the basis of the observation data), the estimation apparatus 20 transmits the estimate value in the current term (the estimate value after update) to the construction machine 10 via the communication control section 301.

[System Operation]

Figure 5:
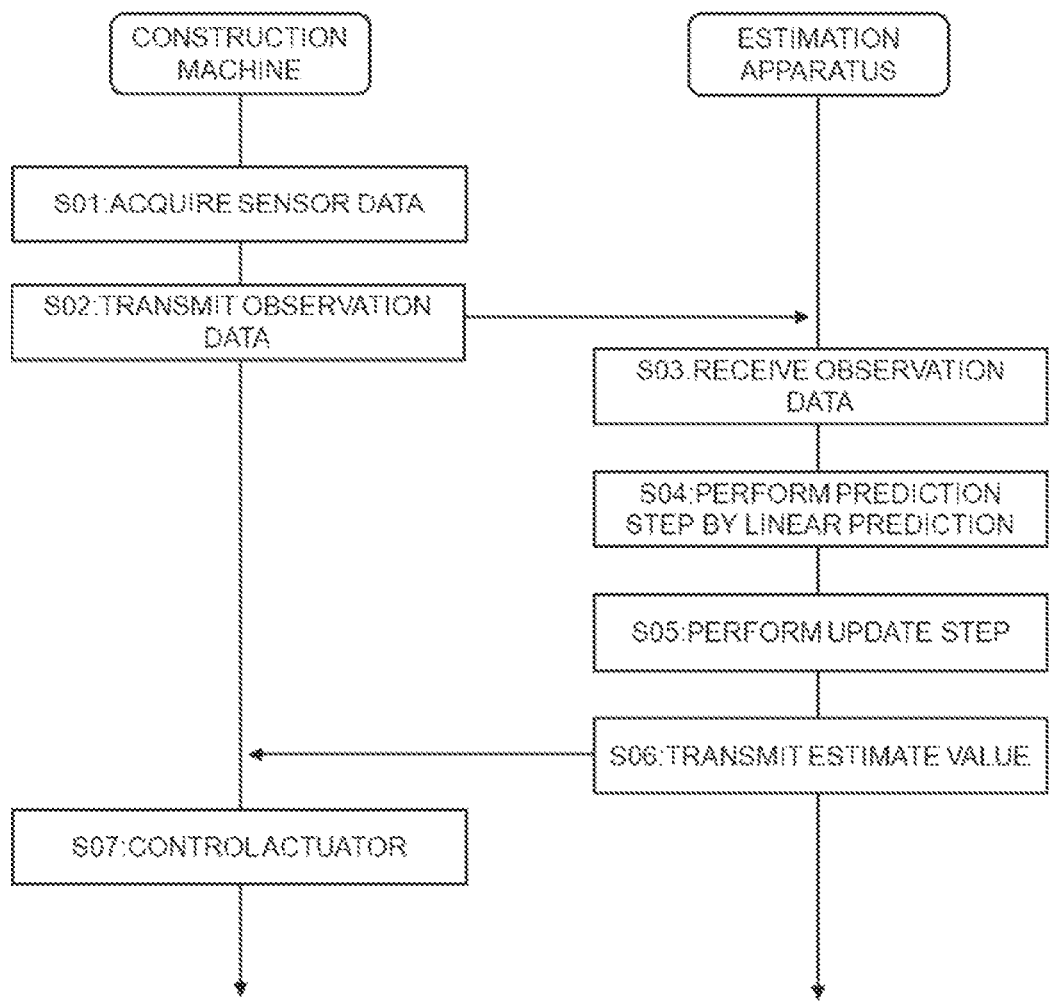
FIG. 5 is a sequence diagram illustrating an example of an operation of the control system according to the first example embodiment.

Subsequently, an operation of the control system according to the first example embodiment is described with reference to the drawings. FIG. 5 is a sequence diagram illustrating an example of the operation of the control system according to the first example embodiment.

The construction machine 10 acquires the sensor data from the sensor 11 with a predetermined period (step S01).

The construction machine 10 transmits the acquired sensor data as the observation data to the estimation apparatus 20 (step S02). Note that the construction machine 10 may perform predetermined processing on the acquired sensor data and transmit the sensor data subjected to the predetermined processing as the observation data to the estimation apparatus 20. For example, the construction machine 10 may convert the acquired sensor data such that the sensor data falls within a predetermined range. Alternatively, the construction machine 10 may calculate another physical quantity using the acquired sensor data to transmit relevant another physical quantity as the observation data to the estimation apparatus 20. For example, in a case that not the tilt sensor but an angular velocity sensor is attached to the construction machine 10, the construction machine 10 (sensor control section 202) may calculate the angle of bucket using an output value of the angular velocity sensor to transmit the bucket angle as the observation data to the estimation apparatus 20.

The estimation apparatus 20 receives the observation data (step S03) and stores the received data in the storage section 303.

The estimation apparatus 20 performs the linear prediction on the basis of the observation data (step S04). At this time, the estimation apparatus 20 performs the calculation of the estimate value before update in the prediction step in the Kalman filter algorithm by using the linear prediction (weighted linear prediction).

The estimation apparatus 20 performs the update step by using a result obtained by the prediction step (estimate value before update, error covariance before update) (step S05).

The estimation apparatus 20 transmits the estimate value after update obtained by performing the update step to the construction machine 10 (step S06).

The construction machine 10 controls the actuator on the basis of the acquired estimate value (step S07).

[Effect]

Subsequently, a filtering performance of the estimation apparatus 20 according to the first example embodiment is explored with reference to the drawings.

First, a performance of the existing Kalman filter algorithm is described.

Figure 6:
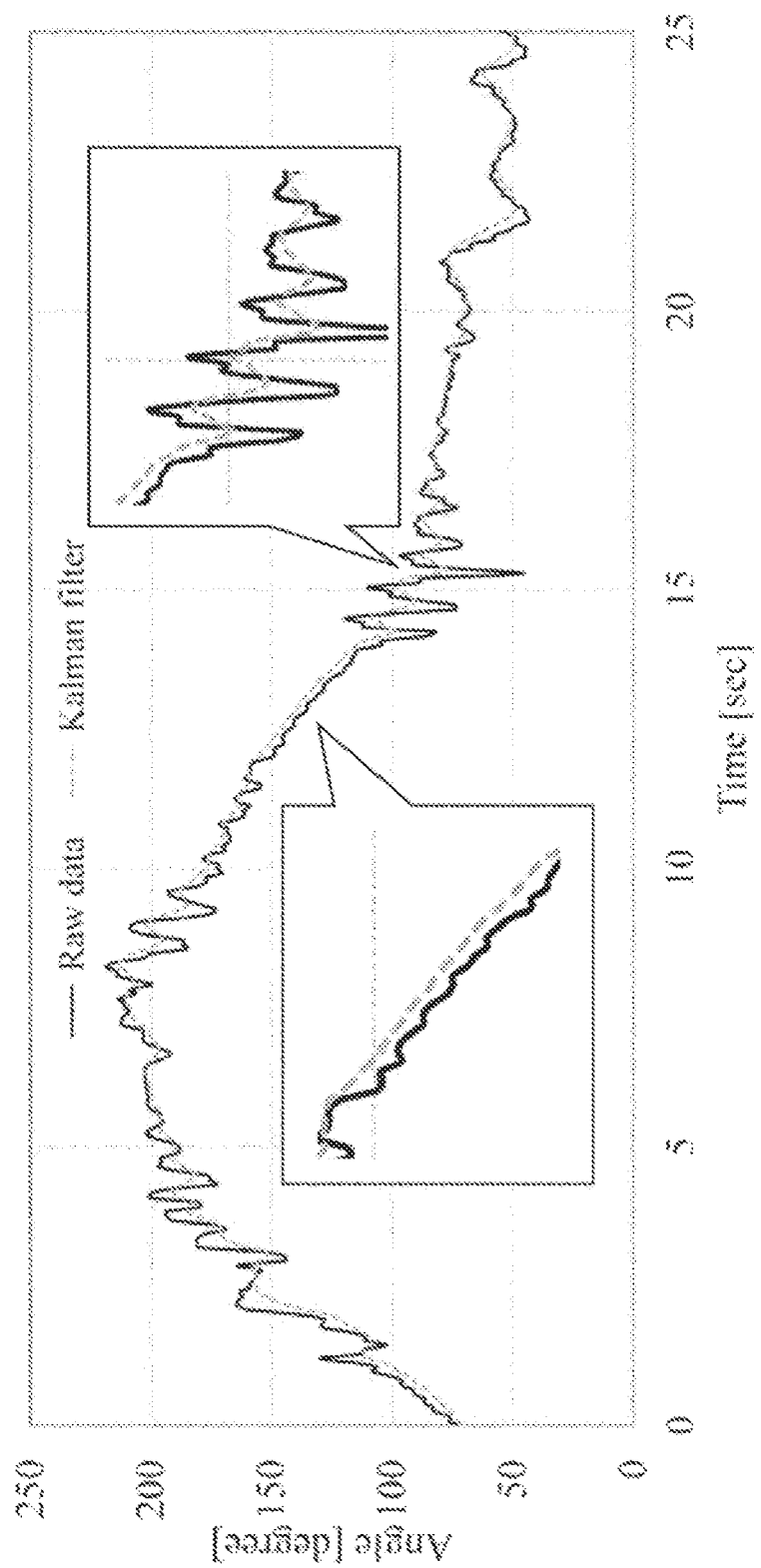
FIG. 6 is a diagram illustrating an estimated result in a case of applying an existing Kalman filter algorithm to a bucket angle output by a sensor attached to a bucket of the construction machine.

FIG. 6 is a diagram illustrating an estimated result in a case of applying the existing Kalman filter algorithm to the bucket angle output by the sensor 11 (tilt sensor) attached to the bucket of the construction machine 10. Note that although complex state equations are required to be established in applying the Kalman filter as described above, in calculating the result illustrated in FIG. 6, the identity matrix I is used as the state matrix A and the observation coefficient matrix H, and a null matrix is used as the input matrix B.

With reference to FIG. 6, it is found that a prescribed delay is generated between the observation data (Raw data) and the estimate value after the Kalman filter is applied (Kalman Filter; a dotted line in FIG. 6). In particular, as enlarged in a rectangular balloon on the left side in FIG. 6, a delay that cannot be overlooked is found during the times 10 to 15. If such a delay is generated, a real time control is difficult to achieve.

Figure 7:
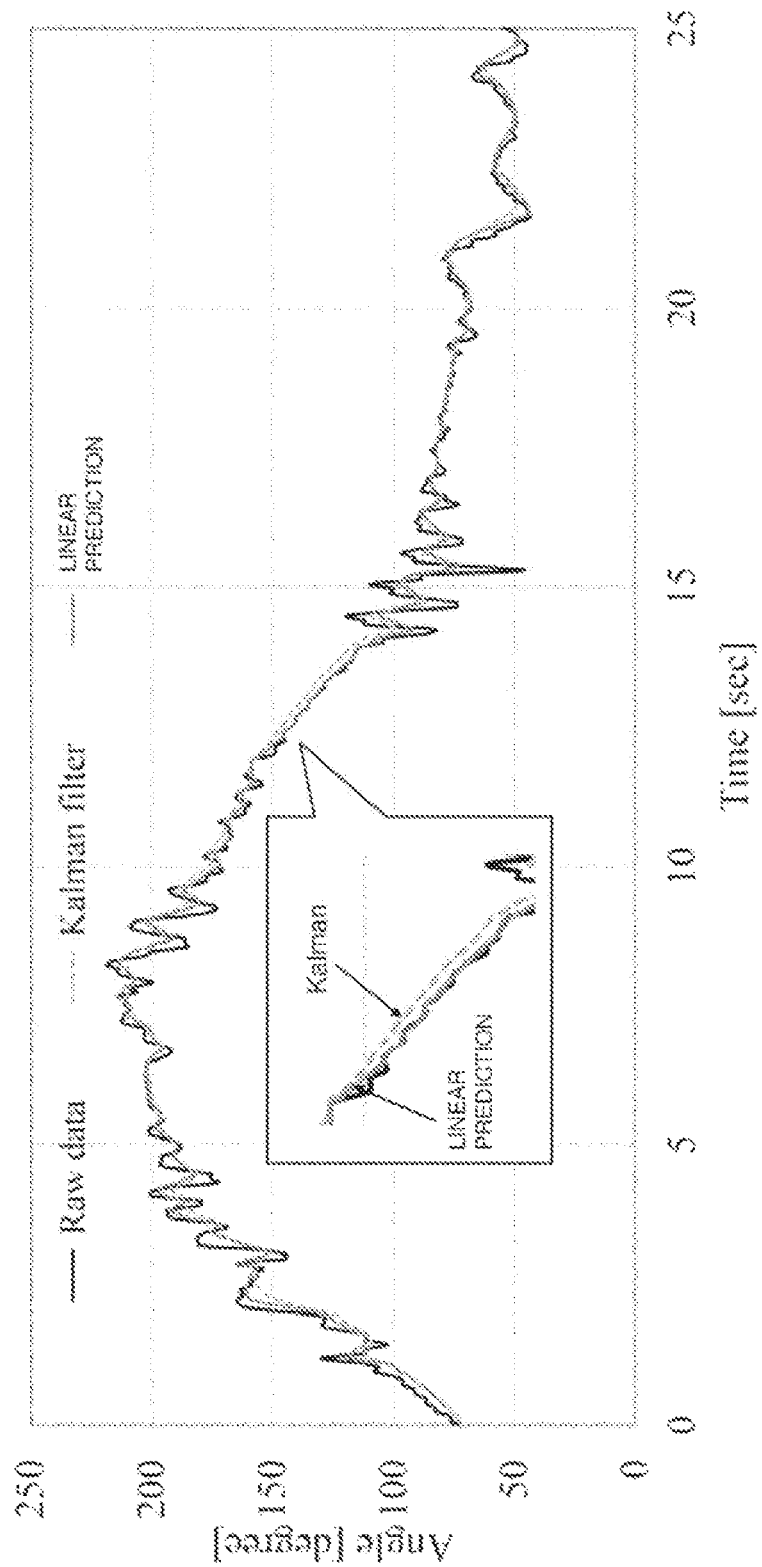
FIG. 7 is a diagram illustrating an example of the estimated result in a case of applying an estimation method by linear prediction described in the first example embodiment to the bucket angle output by the sensor.

FIG. 7 is a diagram illustrating an example of the estimated result in a case of applying the estimation method by the linear prediction described in the first example embodiment to the bucket angle output by the sensor 11.

With reference to FIG. 7, in the estimated result by the estimation apparatus 20, it is found that the delay generated in the existing Kalman filter is almost disappeared (see a rectangular balloon in FIG. 7).

As described above, the estimation apparatus 20 according to the first example embodiment executes the linear prediction on the basis of the history of the observation data to implement the prediction step without using the state equation. For this reason, even if the complex state equation is not prepared in advance, the filtering in accordance with the Kalman filter algorithm can be achieved. Specifically, an adaptive filtering not requiring the modeling using the state equation (model-free adaptive filtering) can be achieved.

The estimation apparatus 20 according to the first example embodiment, which performs the weighted linear prediction, can swiftly deal with even an observation value having an acceleration. Specifically, the estimation apparatus 20 uses the weight of which a value is larger as the time is closer to the current term, and thus, can quickly deal with a recent change in the observation value. This can be found from a waveform at around 2 to 3 seconds in FIG. 7.

Second Example Embodiment

Subsequently, a second example embodiment is described in more detail with reference to the drawings.

Here, in order to use the Kalman filter, the variance values of the observation error or the modeling error are required. In this view, in the first example embodiment, the system administrator takes the state or operation contents of the target to be controlled into consideration to determine the variance values Q and R of the observation error and the modeling error. That is, the Kalman filter is based on an assumption that the variance values Q and R are the fixed values. However, a sufficient filtering performance may not be obtained based on such an assumption.

The observation error is an error involved in sensing using the sensor. The target to be controlled such as a construction machine and a robot mostly includes a drive system, where characteristics of the errors are different depending on operation situations thereof.

Specifically, the characteristics (such as magnitude, frequency, of the like) of the errors superimposed on the sensor data are greatly different depending on a vibration or environment when the actuator is driven (or when the construction machine operates). For this reason, if the error variance is handed as the fixed value similarly to the assumption of the Kalman filter, an accurate estimate value (that is an estimate value closer to the true value) cannot be obtained.

For example, given a backhoe as an example of the construction machine 10, in excavating, earth and sand contact the bucket, and the vibrations generated on the bucket and the arm are larger than in not excavating. As a result, the noises included in the sensor data in excavating are larger than the noises in not excavating. In other words, the variance value of the sensor data (observation data) acquired in excavating by the construction machine 10 may be possibly larger than the initially expected variance value (fixed value).

As a result, reliability of the sensor data acquired in excavating may be low. In the Kalman filter based on the assumption that the variance value of the observation error is fixed, the sensor data in excavating with the low reliability is handled the same as the sensor data in not excavating with the high reliability, and thus, the estimate value in excavating results in low accuracy. For example, referring to a rectangular balloon on the right side in FIG. 6, it is found that the observation data includes large noises, and influence of the noises causes variation of the estimate value to be larger. However, in practice, the bucket angle in the construction machine 10 excavating does not involve the variation as illustrated in the rectangular balloon on the right side in FIG. 6 in many cases.

The modeling error is an error between the model expressed by the state equation and the real system. An accurate modeling error is difficult to calculate as is the accurate state equation difficult to generate. As described above, the Kalman filter handles the variance value of the modeling error as the fixed value to calculate the estimate value.

However, in the real system, handling the variance value of the modeling error as the fixed value may not be reasonable in some cases. For example, there is a tendency that the variance value of the modeling error is large when the input value is small, and the variance value of the modeling error is small when the input value is large.

Therefore, if the variance value of the modeling error is handled as the fixed value in the same manner as the assumption of the Kalman filter, the priori error covariance calculated in the prediction step depending on the magnitude of the input value may have an inaccurate value. If accuracy of the priori error covariance is low, accuracies of the Kalman gain and the estimate value after update calculated in the update step are also low.

In the second example embodiment, the estimation apparatus 20 is described that deals with an issue generated on the assumption that the variance value of the error is known (fixed value) in the Kalman filter.

The estimation apparatus 20 according to the second example embodiment estimates the variance value of the observation error from the observation data. The estimation apparatus 20 uses the estimated variance value to calculate the Kalman gain. The estimation apparatus 20 estimates the variance value of the modeling error from the input value acquired from the construction machine 10. The estimation apparatus 20 uses the estimated variance value to calculate the error covariance before update.

Figure 8:
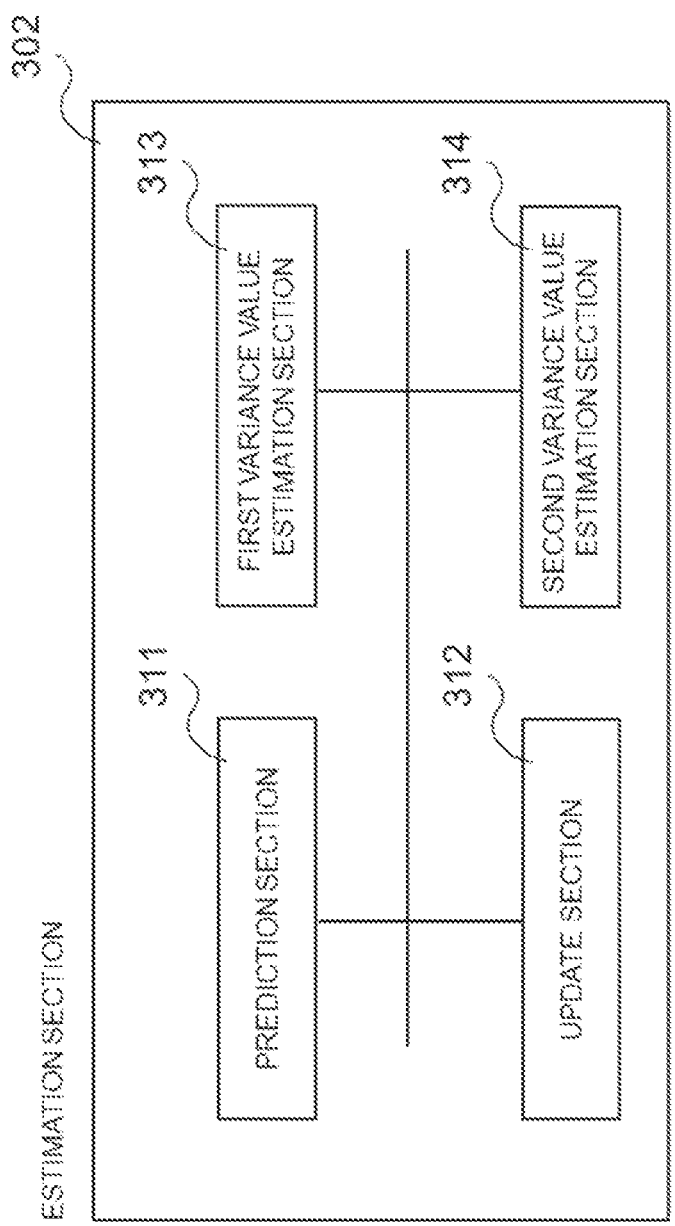
FIG. 8 is a diagram illustrating an example of a processing configuration of an estimation section included in an estimation apparatus according to a second example embodiment.

FIG. 8 is a diagram illustrating an example of a processing configuration of the estimation section 302 included in the estimation apparatus 20 according to the second example embodiment. With reference to FIG. 8, compared with the estimation section 302 included in the estimation apparatus 20 according to the first example embodiment, a first variance value estimation section 313 and a second variance value estimation section 314 are added.

Note that the estimation apparatuses 20 according to the first and second example embodiments can be the same in the processing configuration except for the estimation section 302, and thus, the description of the drawings corresponding to FIG. 4 is omitted.

The actuator control section 203 in the construction machine 10 according to the second example embodiment transmits the input value for the actuator to the estimation apparatus 20.

Hereinafter, concerning the estimation apparatus 20 according to the second example embodiment, differences from the first example embodiment are mainly described.

The first variance value estimation section 313 is a means for estimating the variance value of the modeling error. To be more specific, the first variance value estimation section 313 estimates the variance value of the modeling error on the basis of the input value for an actuator of the target to be controlled, the input value being acquired from the construction machine 10 that is the target to be controlled.

The first variance value estimation section 313 inputs the input value for the actuator acquired from the construction machine 10 (hereinafter, referred to as an actuator input value) to a modeling error variance value generating function. The first variance value estimation section 313 delivers an output result of the function (an estimation variance value of the modeling error) to the prediction section 311.

The modeling error variance value generating function is a function that takes the actuator input value to output the variance value of the modeling error corresponding to that input value. The modeling error variance value generating function is prepared in advance before managing the control system.

For example, in a real machine of the construction machine 10 that is the target to be controlled, the input value for the actuator is varied to acquire the sensor data of the sensor 11. A plurality of pieces of sensor data are acquired per the input value for the actuator, and the variance value is calculated from the plurality of pieces of sensor data. By repeatedly calculating the variance value of the sensor data while the input value for the actuator is varied in such a manner, the variance value per the input value is acquired.

The modeling error variance value generating function can be generated using the variance value per the input value. For example, the modeling error variance value generating function may include a table in which the input values are associated with the variance values, or may be a function to output the variance value for any input value using linear interpolation or the like.

The prediction section 311 uses the estimation variance value of the modeling error acquired from the first variance value estimation section 313 to calculate the error covariance before update. Specifically, the prediction section 311 calculates the error covariance before update by using an estimated variance value $Q'$ as the variance value $Q$ expressed in equation (4) (see, equation (15)). Note that in equation (4), the state matrix A is handled as the identity matrix I.

[Math. 15]

$$P_k^- = P_{k-1} + Q' \tag{15}$$

The second variance value estimation section 314 is a means for estimating the variance value of the observation error. The second variance value estimation section 314 estimates the variance value of the observation error in real time on the basis of the observation data accumulated in the storage section 303. Specifically, the second variance value estimation section 314 calculates the variance value of the observation data in accordance with equation (16) below.

[Math. 16]

$$R_k = \frac{\sum (z_k - \bar{z})^2}{n-1} \quad (16)$$

The second variance value estimation section 314 delivers the calculated variance value $R_k$ to the update section 312.

The update section 312 uses the variance value $R_k$ of the observation error acquired from the second variance value estimation section 314 to perform the update step. Specifically, the update section 312 calculates the Kalman gain by using the estimated variance value $R_k$ in place of the variance value R expressed in equation (5) (see, equation (17)). Note that in equation (5), the observation coefficient matrix H is handled as the identity matrix I.

[Math. 17]

$$K_k = P_k^-(P_k^- + R_k)^{-1} \quad (17)$$

The second example embodiment describes the case that the respective variance values of the modeling error and observation error are estimated, but the variance value of either one of the errors may be estimated depending on a situation, use application, environment, or the like of the control system. For example, as for the modeling error, under a condition such as that the input value for the actuator is limited to a predetermined range, the variance value of the modeling error may be a fixed value.

[Effect]

Subsequently, the filtering performance of the estimation apparatus 20 according to the second example embodiment is explored with reference to the drawings. Here, the exploration is made on a case that variance of the observation error is estimated in real time to calculate the Kalman gain by using the estimated variance value.

Figure 9:
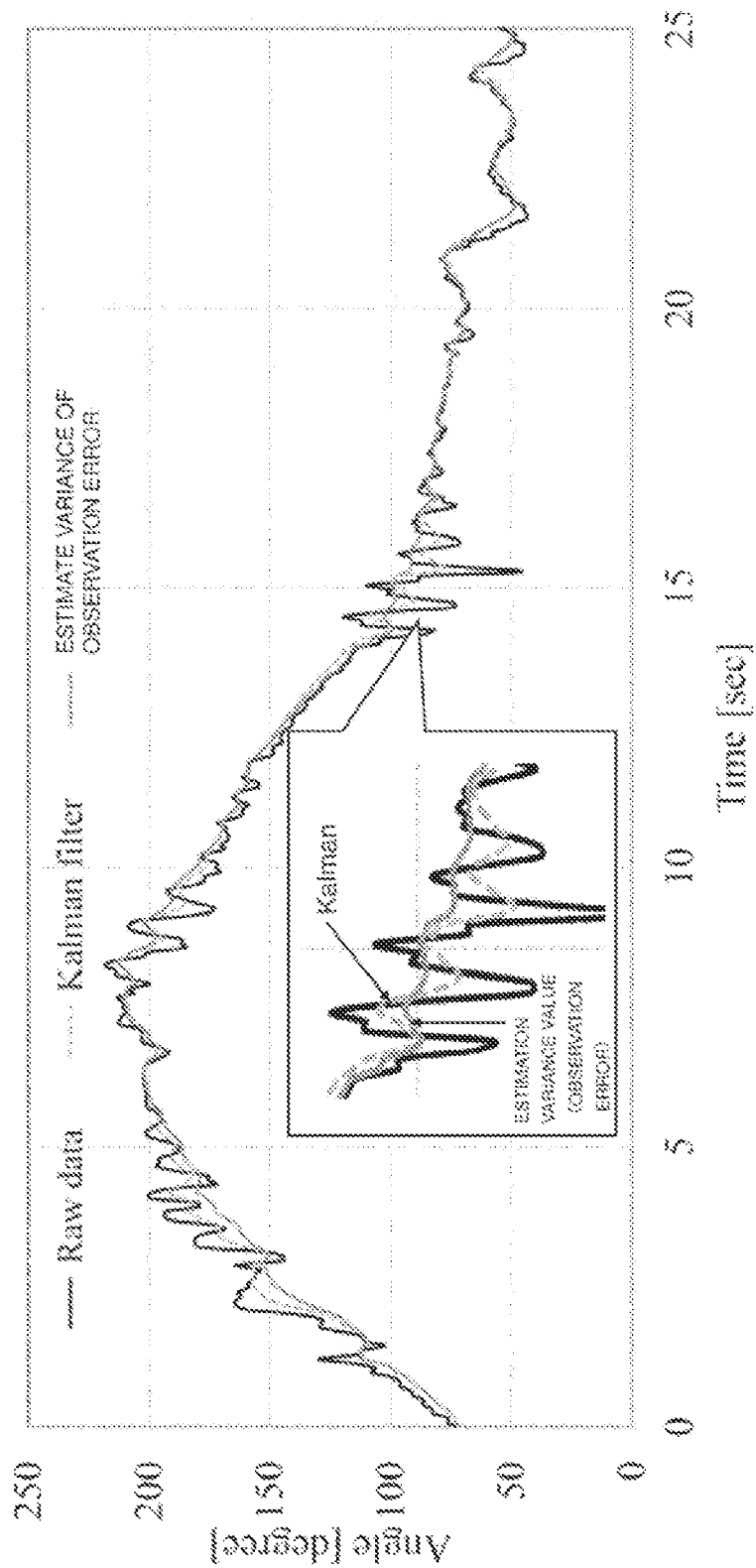
FIG. 9 is a diagram illustrating an example of an estimated result in a case of applying error variance value estimation described in the second example embodiment to the bucket angle output by the sensor.

FIG. 9 is a diagram illustrating an example of an estimated result in a case of applying the error variance value estimation described in the second example embodiment to the bucket angle output by the sensor 11. With reference to FIG. 9, it is found that in the estimation apparatus 20 according to the second example embodiment, a noise cancellation performance in excavating is improved (see a rectangular balloon in FIG. 9).

In a time zone as illustrated by the rectangular balloon in FIG. 9, noise component included in the observation data is large, and thus, the variance value is large. The fact that the variance value is large means that the reliability of the observation data (estimation accuracy) is low. In this case, the estimation apparatus 20 according to the second example embodiment suppress the Kalman gain to be low. Note that it is obvious from equation (17) that the Kalman gain decreases as the variance value increases. That is, in the second example embodiment, in the case that the variance value of the observation error is large so that the observation data is not reliable, the influence is made low on the estimate value after update of the observation data that is low in the reliability. As a result, the accuracy of the estimate value after update is improved to provide a high accurate estimated result as illustrated in FIG. 9.

As described above, in the second example embodiment, the variance value of the error is estimated. As a result, the influence of the observation error or the modeling error depending on the situation or operation (in being driven or not driven) of the target to be controlled can be removed or mitigated. For example, the estimation apparatus 20 estimates the variance value of the observation error on the basis of the observation data (the time-series data of the observation values) to deal with the noise variation depending on the drive or operation of the construction machine 10. As a result, the variance value of the observation error changes in real time such that the system situation is reflected, and then, the update step depending on (suitable for) the system situation is performed.

Third Example Embodiment

Subsequently, a third example embodiment is described in more detail with reference to the drawings.

An abnormal value (outlier) deviating from a noise usually expected to be generated may be observed depending on the situation or environment of the target to be controlled. Such an abnormal value is not particularly generated in a case of many vibrations, and is considered to be generated by sudden electromagnetic waves breaking in.

The Kalman filter is based on the assumption that the modeling error and the observation error are in accordance with the Gaussian distribution (normal distribution), where even if a large abnormal value is generated, the abnormal value is used to estimate the true value. As a result, an estimate value at a moment when the abnormal value is generated is low in the accuracy.

In the third example embodiment, the estimation apparatus 20 correcting the abnormal value (outlier) included in the observation data is described.

Figure 10:
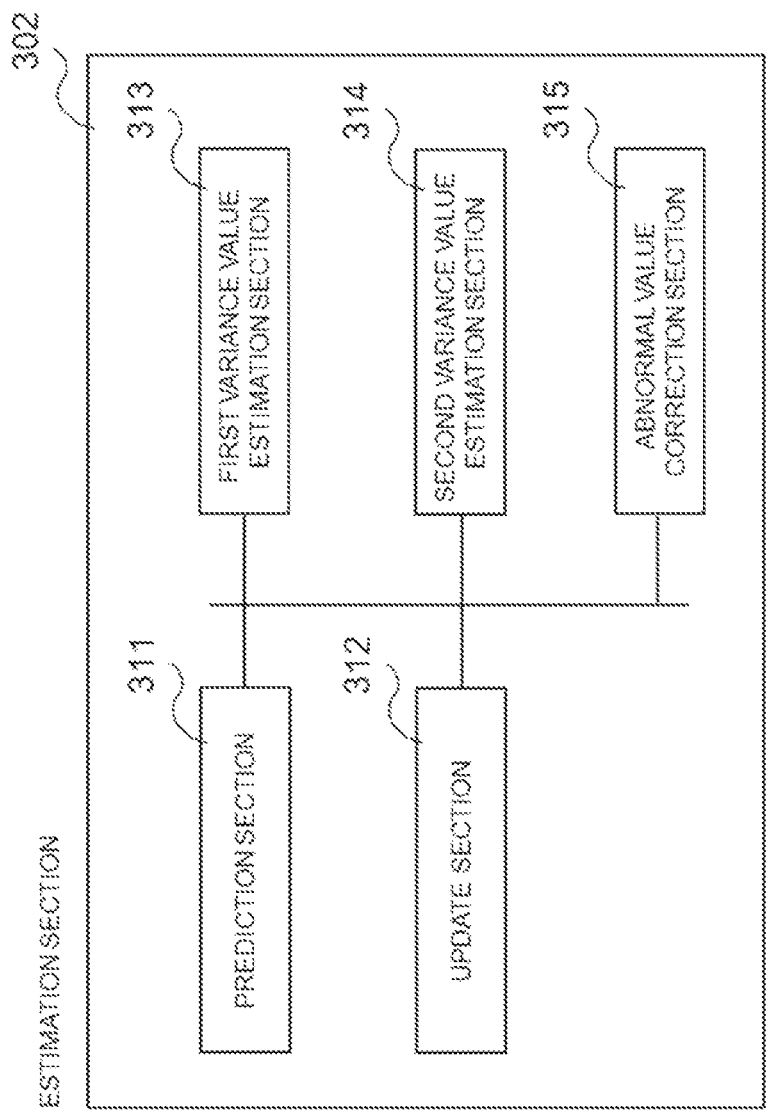
FIG. 10 is a diagram illustrating an example of a processing configuration of an estimation section included in an estimation apparatus according to a third example embodiment.

FIG. 10 is a diagram illustrating an example of a processing configuration of the estimation section 302 included in the estimation apparatus 20 according to the third example embodiment. With reference to FIG. 10, compared to the estimation section 302 included in the estimation apparatus 20 according to the second example embodiment, an abnormal value correction section 315 is added in the estimation apparatus 20 according to the third example embodiment.

Note that the estimation apparatuses 20 according to the first and third example embodiments can be the same in the processing configuration except for the estimation section 302, and thus, the description of the drawings corresponding to FIG. 4 is omitted.

Hereinafter, concerning the estimation apparatus 20 according to the third example embodiment, differences from the first and second example embodiments are mainly described.

The prediction section 311 delivers the estimate value before update calculated in the linear prediction to the abnormal value correction section 315.

The abnormal value correction section 315 is a means of determining whether or not the observation value of a current term is an abnormal value and correcting the observation value determined as an abnormal value, on the basis of at least the estimate value before update and the observation value of the current term. The abnormal value correction section 315 uses the estimate value before update acquired from the prediction section 311 and the observation value read from the storage section 303 to verify whether there is an abnormal value. Specifically, the abnormal value correction section 315 calculates an absolute value of a difference between the estimate value before update and the observation value (the observation value of the current term).

After that, when the absolute value of the difference is larger than a predetermined threshold, the abnormal value correction section 315 determines that the observation value read from the storage section 303 is an abnormal value.

When the absolute value of the difference is equal to or less than the predetermined threshold, the abnormal value correction section 315 determines that the observation value read from the storage section 303 is not an abnormal value.

The abnormal value correction section 315 corrects the observation value on the basis of a result of determination on the observation value read from the storage section 303 (determination on whether the observation value is the abnormal value).

Specifically, when the observation value is not determined as the abnormal value, the abnormal value correction section 315 does not make any correction of the observation value. In contrast, when the observation value is determined as the abnormal value, the abnormal value correction section 315 corrects the observation value to be equal to the estimate value before update acquired from the prediction section 311.

The operation of the abnormal value correction section 315 is expressed as equation (18) and equation (19) below.

[Math. 18]

$$d_{\bar{k}} = \|\hat{x}_{\bar{k}} - z_k\| \quad (18)$$

[Math. 19]

$$z'_k = \begin{cases} z_k & (d_{\bar{k}} \leq d_{th}) \\ \hat{x}_{\bar{k}} & (d_{\bar{k}} > d_{th}) \end{cases} \quad (19)$$

Note that $Z'_k$ expressed in equation (19) represents the corrected observation value.

The abnormal value correction section 315 may use a difference between the estimate value before update of the previous term and the observation value to detect the abnormal value. Specifically, the abnormal value correction section 315 calculates an absolute value $d_{k-1}$ of the difference between the estimate value before update of the previous term and the observation value by using equation (20) below. The abnormal value correction section 315 calculates an absolute value $d_k$ overbar (hereinafter, simply expressed as an absolute value $d_k$ in the description except for the equations) of a difference between the estimate value before update and the observation value in accordance with equation (18).

[Math. 20]

$$d_{k-1} = \|\hat{x}_{k-1} - z_k\| \quad (20)$$

The abnormal value correction section 315 selects any larger one of two absolute values $d_k$ and $d_{k-1}$ to use the selected one as the absolute value d (see equation (21)).

[Math. 21]

$$d = \max(d_{\bar{k}}, d_{k-1}) \quad (21)$$

The abnormal value correction section 315 corrects the observation value read from the storage section 303 on the basis of a result of threshold processing on the selected absolute value d, and a magnitude relationship between two absolute values $d_k$ and $d_{k-1}$ (magnitude relationship between first and second absolute values).

When the selected absolute value is equal to or less than a threshold $d_{th}$, the abnormal value correction section 315 does not correct the observation value read from the storage section 303.

When the selected absolute value d is larger than the threshold $d_{th}$, and the absolute value $d_k$ is smaller than the absolute value $d_{k-1}$, the abnormal value correction section 315 corrects the read observation value to be equal to the estimate value before update of the current term.

When the selected absolute value d is larger than the threshold $d_{th}$, and the absolute value $d_k$ is equal to or more than the absolute value $d_{k-1}$, the abnormal value correction section 315 corrects the read observation value to be equal to the estimate value after update of the previous term.

The operation of the abnormal value correction section 315 is expressed as equation (22) below.

[Math. 22]

$$z'_k = \begin{cases} z_k & (d \leq d_{th}) \\ \hat{x}_{\bar{k}} & (d > d_{th} \wedge d_{\bar{k}} < d_{k-1}) \\ \hat{x}_{k-1} & (d > d_{th} \wedge d_{\bar{k}} \geq d_{k-1}) \end{cases} \quad (22)$$

As described in the middle row of equation (22), the abnormal value correction section 315 corrects the read observation value to be equal to the estimate value before update of the current term on the basis of the magnitude relationship between the absolute value $d_k$ and the absolute value $d_{k-1}$. In this case, a divergence of the estimate value before update of the current term from the observation value of the current term is smaller than a divergence of the estimate value before update of the previous term from the observation value. As such, the abnormal value correction section 315 considers that the estimate value before update of the current term is closer to the true value, and corrects the read observation value to be equal to the estimate value before update of the current term. Similarly, as described in the lower row of equation (22), the abnormal value correction section 315 corrects the read observation value to be equal to the estimate value after update of the previous term on the basis of the magnitude relationship between the absolute value $d_k$ and the absolute value $d_{k-1}$. In this case, the divergence of the estimate value before update of the current term from the observation value of the current term is larger than the divergence of the estimate value before update of the previous term from the observation value. As such, the abnormal value correction section 315 considers that the estimate value after update of the previous term is closer to the true value, and corrects the read observation value to be equal to the estimate value after update of the previous term.

The abnormal value correction section 315 delivers the observation value z' corrected in accordance with, for example, equation (19) or equation (22) to the update section 312.

The update section 312 uses the corrected observation value z' acquired from the abnormal value correction section 315 to perform the updates step. Specifically, the update section 312 calculates the estimate value after update by using the corrected observation value z' in place of the observation value z expressed in equation (6) (see equation (23)).

[Math. 23]

$$\hat{x}_k = \hat{x}_k^- + K_k \quad (23)$$

[Effect]

Subsequently, the filtering performance of the estimation apparatus 20 according to the third example embodiment is explored with reference to the drawings.

Figure 11:
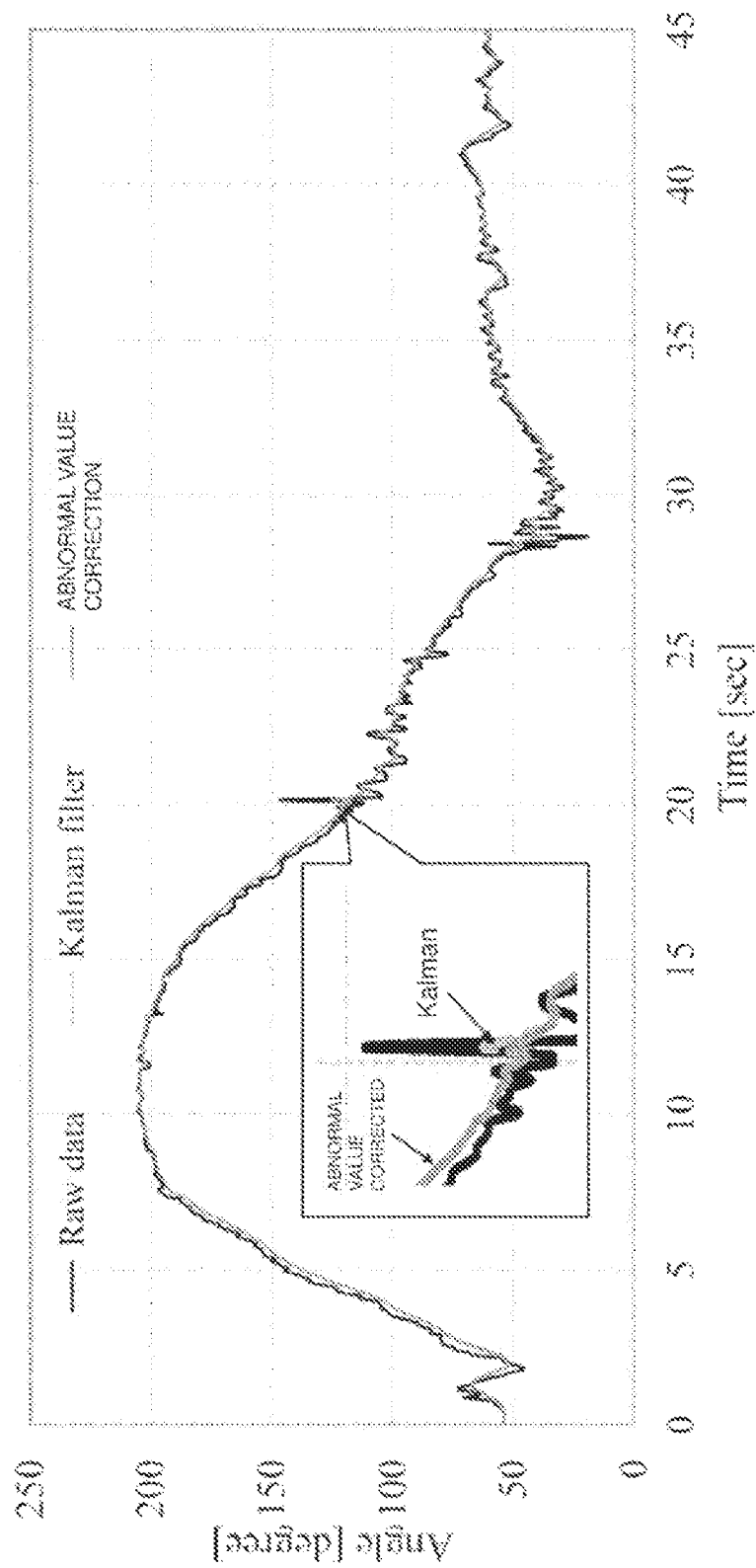
FIG. 11 is a diagram illustrating an example of an estimated result in a case of applying abnormal value correction described in the third example embodiment to the bucket angle output by the sensor.

FIG. 11 is a diagram illustrating an example of an estimated result in a case of applying the abnormal value correction described in the third example embodiment to the bucket angle output by the sensor 11. With reference to FIG. 11, it is found that, in the result of applying the Kalman filter, the estimate value deviates upward with receiving an influence of a suddenly generated abnormal value (see a rectangular balloon in FIG. 11).

In contrast, it is found that, in the estimated result of the estimation apparatus 20 according to the third example embodiment, the estimate value is calculated without greatly receiving an influence of a suddenly generated abnormal value. This is because when the abnormal value generation is detected, the estimation apparatus 20 discards the abnormal value to replace with the estimate value before update or the estimate value after update of the previous term not receiving the influence of the abnormal value.

As described above, the estimation apparatus 20 according to the third example embodiment compares the prediction value (estimate value) calculated by the linear prediction with the real observation value to detect the abnormal value (outlier), and corrects the observation value in the case that the abnormal value is detected. As a result, the filtering performance of the estimation apparatus 20 is improved.

[Overall Effect]

Effects of each of the example embodiments described above show effects of each scheme alone for improving the filtering performance of the estimation apparatus 20 according to each example embodiment. The contents described in the first to third example embodiments (the prediction step by the linear prediction, the calculation of the error variance value, and the handling of the abnormal value) may be performed individually or in combination.

Performing the contents for improving the filtering performance described in the first to third example embodiments in combination more heightens the filtering performance.

Figure 12:
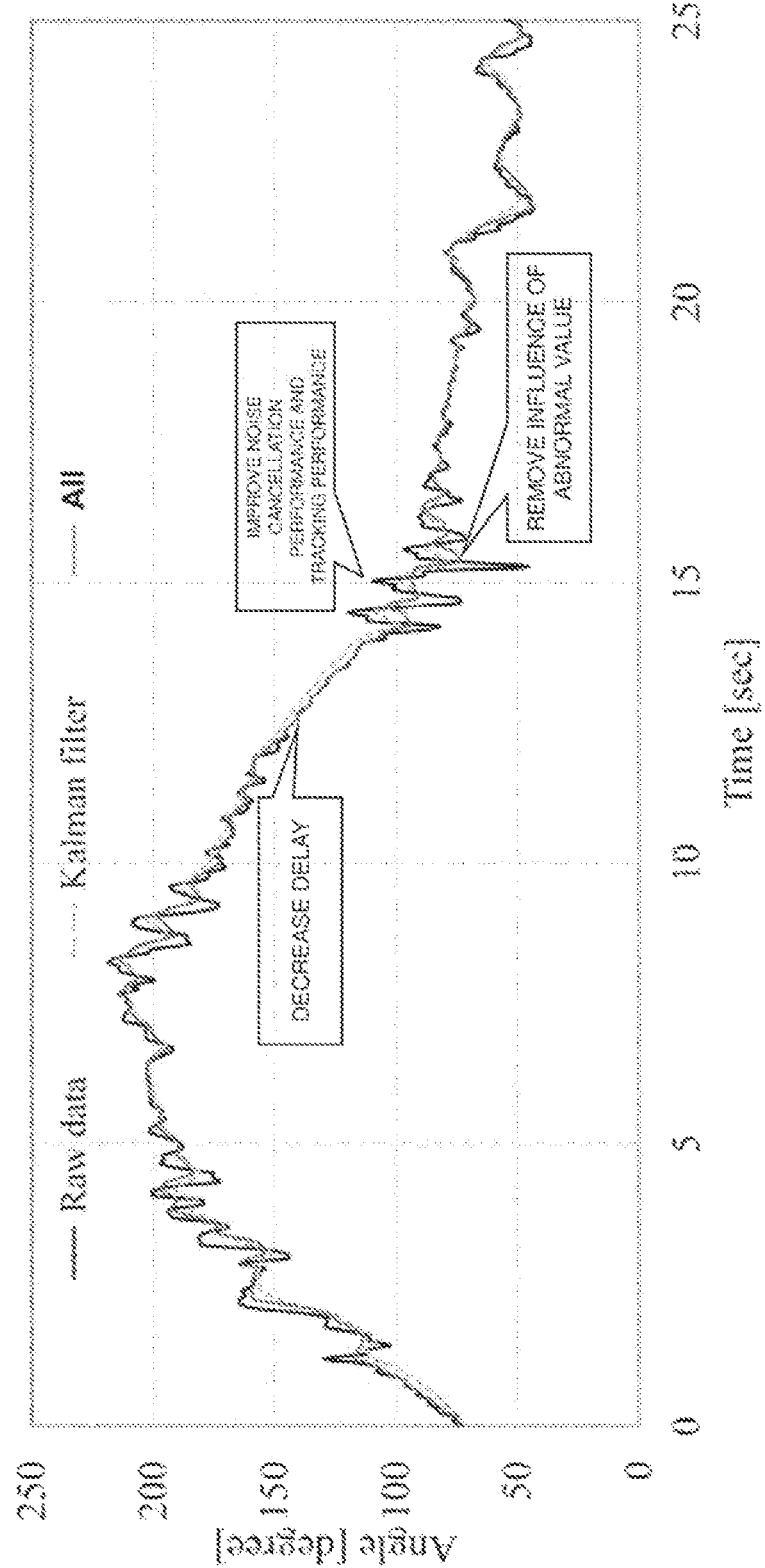
FIG. 12 is a diagram illustrating an example of an estimated result in a case of applying schemes for improving a filtering performance described in the first to third example embodiments to the bucket angle output by the sensor.

FIG. 12 is a diagram illustrating an example of an estimated result in a case of applying the schemes for improving the filtering performance described in the first to third example embodiments to the bucket angle output by the sensor 11. With reference to FIG. 12, it is found that the delay is decreased, the noise cancellation performance and the tracking performance are improved, and the influence of the abnormal value is removed, owing to the respective filtering performance improvement schemes.

Figure 13:
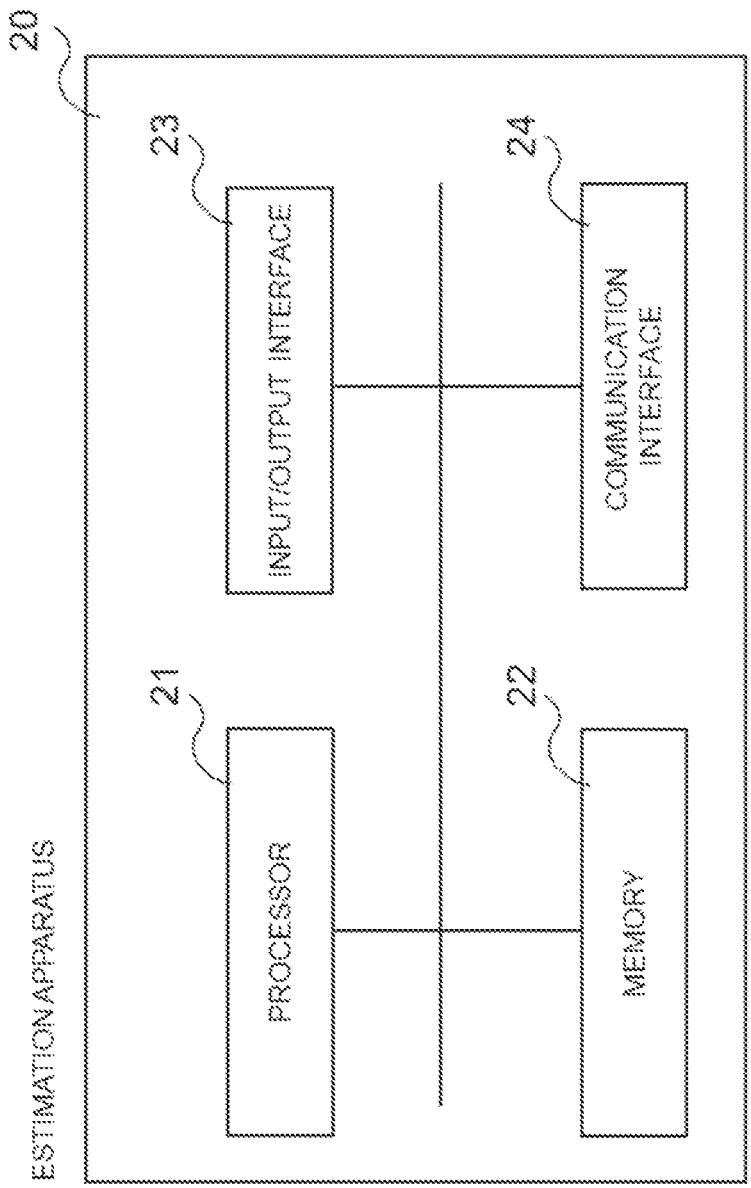
FIG. 13 is a diagram illustrating an example of a hardware configuration of the estimation apparatus.

Next, hardware of each apparatus configuring the control system will be described. FIG. 13 is a diagram illustrating an example of a hardware configuration of the estimation apparatus 20.

The estimation apparatus 20 can be configured with an information processing apparatus (so-called, a computer), and includes a configuration illustrated in FIG. 13. For example, the estimation apparatus 20 includes a processor 21, a memory 22, an input/output interface 23, a communication interface 24, and the like. Constituent elements such as the processor 21 are connected to each other via an internal bus or the like, and are configured to be communicable with each other.

Note that the configuration illustrated in FIG. 13 is not intended to limit the hardware configuration of the estimation apparatus 20. The estimation apparatus 20 may include hardware not illustrated, or may not include the input/output interface 23 as necessary. The number of processors 21 and the like included in the estimation apparatus 20 is not intended to limit to the example illustrated in FIG. 13, and for example, a plurality of processors 21 may be included in the estimation apparatus 20.

The processor 21 is, for example, a programmable device such as a central processing unit (CPU), a micro processing unit (MPU), and a digital signal processor (DSP). Alternatively, the processor 21 may be a device such as a field programmable gate array (FPGA) and an application specific integrated circuit (ASIC). The processor 21 executes various programs including an operating system (OS).

The memory 22 is a random access memory (RAM), a read only memory (ROM), a hard disk drive (HDD), a solid state drive (SSD), or the like. The memory 22 stores an OS program, an application program, and various pieces of data.

The input/output interface 23 is an interface of a display apparatus and an input apparatus (not illustrated). The display apparatus is, for example, a liquid crystal display or the like. The input apparatus is, for example, an apparatus that receives user operation, such as a keyboard and a mouse.

The communication interface 24 is a circuit, a module, or the like that performs communication with another apparatus. For example, the communication interface 24 includes a network interface card (NIC) or the like.

The function of the estimation apparatus 20 is implemented by various processing modules. Each of the processing modules is, for example, implemented by the processor 21 executing a program stored in the memory 22. The program can be recorded on a computer readable storage medium. The storage medium can be a non-transitory storage medium, such as a semiconductor memory, a hard disk, a magnetic recording medium, and an optical recording medium. In other words, the present invention can also be implemented as a computer program product. The program can be updated through downloading via a network, or by using a storage medium storing a program. In addition, the processing module may be implemented by a semiconductor chip.

Note that a hardware configuration of the construction machine 10 is obvious to those of ordinary skill in the art, and detailed description thereof will thus be omitted.

[Example Alterations]

Note that the configuration, the operation, and the like of the control system described in the example embodiments are merely examples, and are not intended to limit the configuration and the like of the system. For example, a database server accumulating and storing the observation data transmitted from the construction machine 10 may be installed, and the estimation apparatus 20 may access the database server to acquire the observation data.

Figure 14:
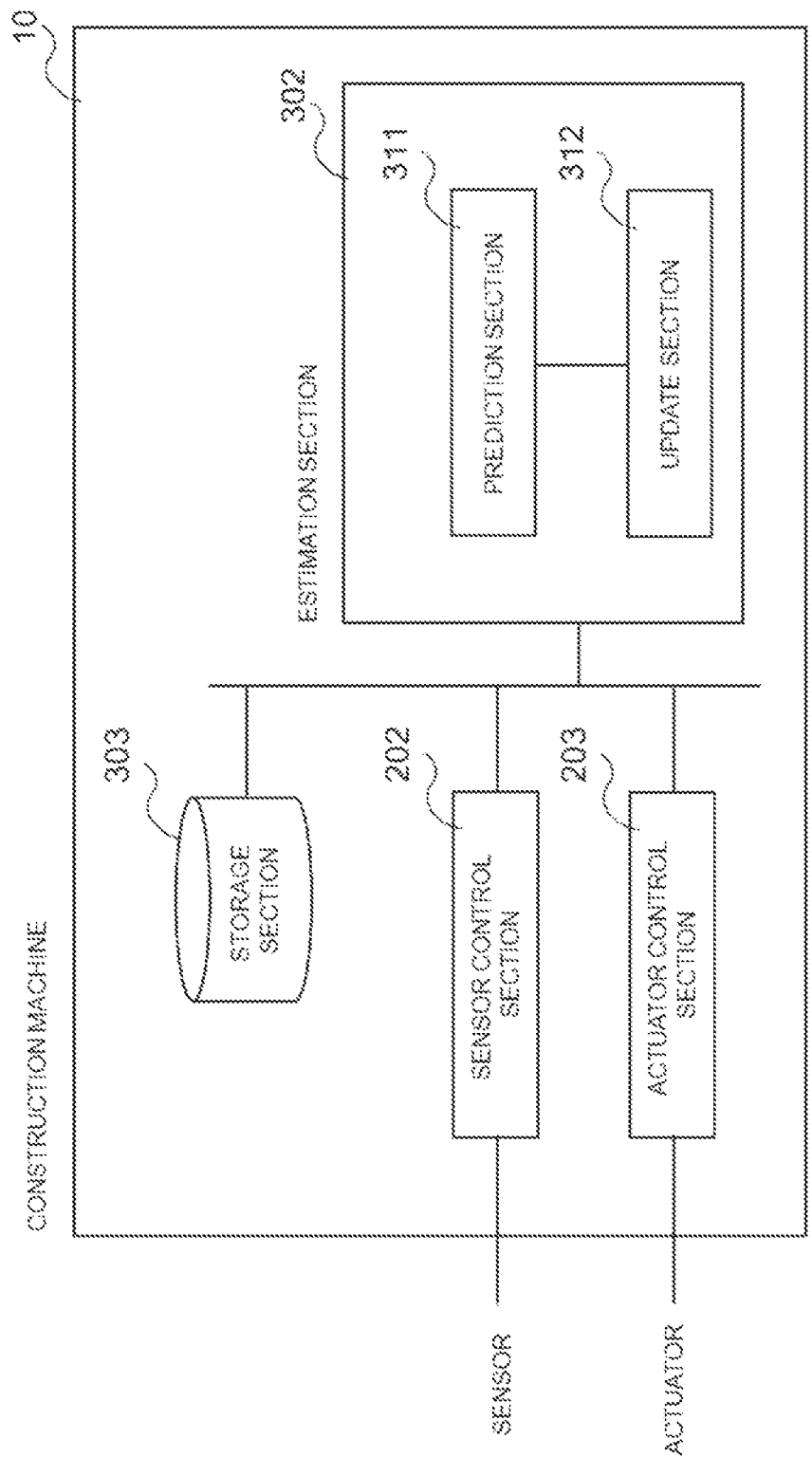
FIG. 14 is a diagram for describing an example alteration according to the present application disclosure.

Although the example embodiments describe a so-called client-server configuration in which the construction machine 10 transmits the observation data to the estimation apparatus 20 and the estimation apparatus 20 returns the estimate value to the construction machine 10, the way of calculating the estimate value in the present application disclosure may be completed within the construction machine 10. For example, as illustrated in FIG. 14, the estimation section 302 described in the example embodiments may be incorporated into the construction machine 10. Note that the operations and the functions of the estimation section 302, the storage section 303, and the like illustrated in FIG. 14 can be the same as those described in the example embodiments, so a further description is omitted.

Figure 15:
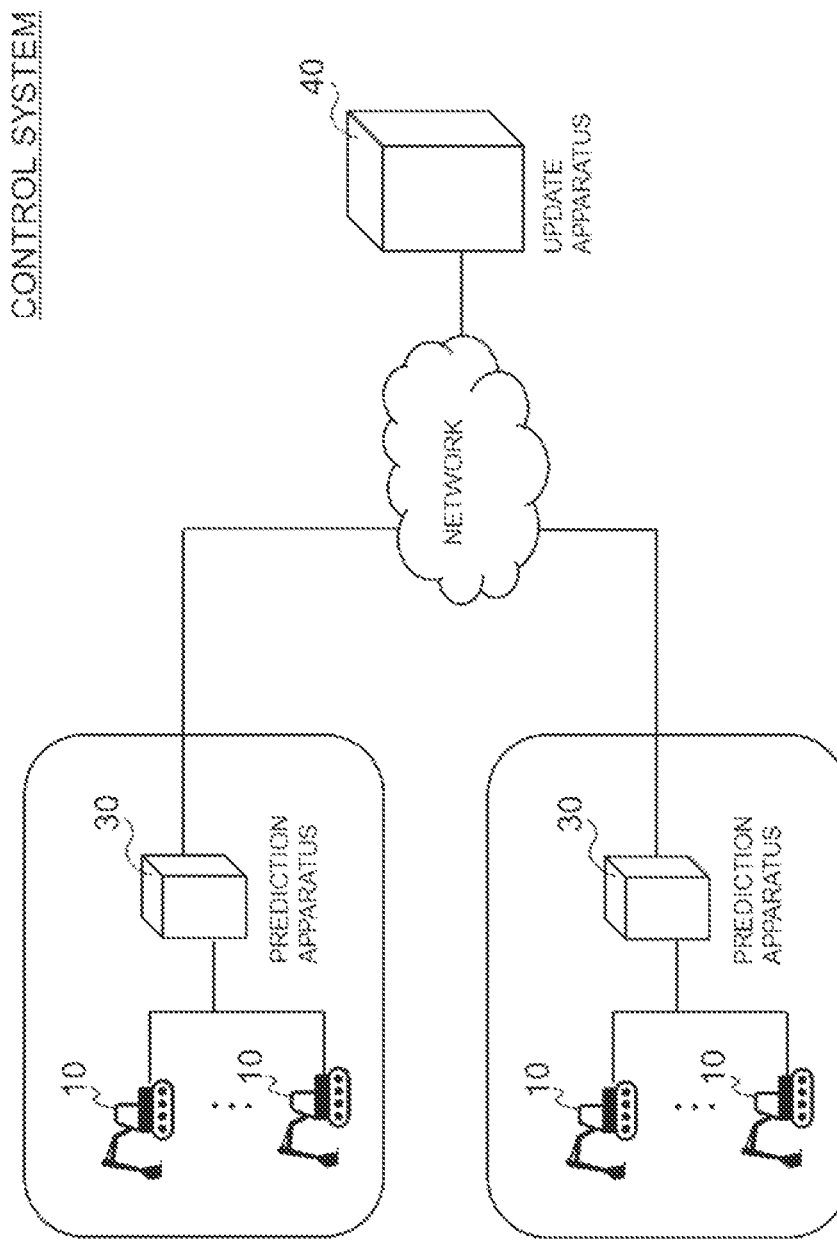
FIG. 15 is a diagram for describing an example alteration according to the present application disclosure.

Alternatively, the present application disclosure may be achieved by a so-called edge cloud system. For example, as illustrated in FIG. 15, a prediction apparatus 30 is located on the construction machine 10 side (edge side). An update apparatus 40 is located over a cloud of a network. The prediction apparatus 30 performs the prediction step of the Kalman filter algorithm described in the example embodiments to transmit a result of performing the prediction step to the update apparatus 40. The update apparatus 40 performs the update step of the Kalman filter algorithm described in the example embodiments to transmit a result of performing the update step to the prediction apparatus 30. In this way, the functions of the estimation apparatus 20 can be divided into the edge side and the cloud side to achieve load sharing. Alternatively, each of the plurality of construction machines 10 may include a processing section (processing module) performing the prediction step of the Kalman filter algorithm described in the example embodiments.

Although the example embodiments describe the operations of the estimation apparatus 20 concerning, as an example, one sensor 11 attached to the bucket of the construction machine 10, a plurality of sensors 11 may be attached to the construction machine 10. In this case, the estimation apparatus 20 performs the processing described in the example embodiments on each of the sensors 11. At this time, the estimation apparatus 20 may change the filtering scheme to be applied to the observation data acquired from each of the plurality of sensors 11 attached to the construction machine 10 depending on an attribute of the sensor 11 (type, attached position, or the like). For example, the estimation apparatus 20 may apply the filtering scheme described in the first example embodiment to the observation data acquired from a sensor A, and may apply the filtering scheme described in the second example embodiment to the observation data acquired from a sensor B. In this manner, changing the processing to be performed depending on the attribute of the sensor allows the load on the estimation apparatus 20 to be reduced, or the required estimation accuracy to be ensured.

In the case that a plurality of sensors 11 are attached to one construction machine 10, the construction machine 10 may separately transmit the sensor data of each sensor 11 to the estimation apparatus 20. Alternatively, the construction machine 10 may group the plurality of sensors 11 to transmit the sensor data for each group to the estimation apparatus 20.

Although the example embodiments describe the construction machine 10 controlling the sensor 11, the construction machine 10 may not control the sensor. For example, a sensor (sensor module) having a communication function may be attached to the existing construction machine, and the observation data may be transmitted directly from the sensor to the estimation apparatus 20.

The estimation apparatus 20 may or may not perform the estimation operation of the state quantity on the basis of the situation, the state, and the like of the construction machine 10. For example, in a case that the construction machine 10 is moving to a construction site, the estimation apparatus 20 does not perform the estimation operation. In contrast, in a case that the construction machine 10 is performing the excavate operation, the estimation apparatus 20 performs the estimation operation. In this case, the construction machine 10 notifies the estimation apparatus 20 of a state of the construction machine 10 (during moving, during the excavate operation), and the estimation apparatus 20 switches between performing and not performing of the estimation operation according to the notification. Alternatively, the construction machine 10 may receive GPS signals from Global Positioning System (GPS) satellites to perform positioning, and notify the estimation apparatus 20 of position information of the construction machine 10 (latitude, longitude, and altitude). The estimation apparatus 20 may switch between performing and not performing of the estimation operation depending on the position information. For example, the estimation apparatus 20, in a case of confirming that the construction machine 10 arrives at a predefined construction site, may perform the estimation operation. In this manner, switching between performing and not performing of the estimation operation depending on the situation and the state of the construction machine 10 can suppress unnecessary estimation processing to reduce the load on the estimation apparatus 20.

Although the example embodiments describe the case of using the "modeling error variance value generating function" in estimating the variance value of the modeling error, the variance value may be estimated by using a learning model (classification model). Specifically, a large amount of training data for the variance value corresponding to the input value is prepared, and the training data is used to perform machine learning. The actuator input value may be input to a classification model generated by the machine learning to acquire the variance value of the modeling error corresponding to the input value. Note that to generate the classification model, any algorithm such as a support vector machine, boosting, or a neural network may be used. Publicly known techniques can be used for the algorithm such as the support vector machine, and description thereof will thus be omitted.

The classification model may be generated in the estimation apparatus 20. In this case, the estimation apparatus 20 may acquire the training data having features (input value) assigned with a label (the variance value corresponding to the input value) from the plurality of construction machines 10 included in the control system to generate the classification model.

Although the example embodiments calculate the estimate value before update by the weighted linear prediction, the estimate value before update may calculated by unweighted linear prediction. For example, in a case that the observation value does not have an acceleration, even if the estimate value before update is calculated by the unweighted linear prediction, a reasonable result can be obtained.

The estimation apparatus 20 described in the example embodiments may output the estimate value after update to an external apparatus (for example, printer or liquid crystal monitor) or the like. For example, as illustrated in FIG. 7, the estimation apparatus 20 may display the observation data acquired from the construction machine 10 (indicated by a dark solid line in FIG. 7) and the true value (indicated by a faint solid line in FIG. 7) estimated on the basis of the observation data in an overlapped manner. Note that a screen displayed by the estimation apparatus 20 is not limited to the display in FIG. 7, but may be displays illustrated in FIG. 9, FIG. 11, FIG. 12, and the like.

The estimation apparatus 20 described in the example embodiments may be assumed to be a computing machinery (information processing apparatus) equipped with a processor, a memory, or the like. Alternatively, the estimation apparatus 20 may a virtual machine that emulates a plurality of computers on one computer. That is, the estimation apparatus 20 may be a computing machinery such as a server (physical machine), or a virtual machine.

By installing a state estimation program in a storage section of a computer, the computer can be caused to function as the estimation apparatus. By causing the computer to execute the state estimation program, the estimation method can be executed by the computer.

The whole or part of the example embodiments disclosed above can be described as in the following supplementary notes, but are not limited to the following.

(Supplementary Note 1)

An estimation apparatus (20, 100) including:
a prediction section (101, 301) configured to execute linear prediction on time-series data, which includes observation values acquired from a sensor (11) attached to a target to be controlled, to calculate an estimate value before update relating to a state of the target to be controlled; and
an update section (102, 312) configured to update the estimate value before update by using an observation value acquired from the sensor (11).

(Supplementary Note 2)

The estimation apparatus (20, 100) according to supplementary note 1, wherein
the prediction section (101, 311) is configured to calculate the estimate value before update by the linear prediction on the time-series data of the observation values in place of calculation of the estimate value before update using a state equation of a Kalman filter algorithm.

(Supplementary Note 3)

The estimation apparatus (20, 100) according to supplementary note 2, wherein
the prediction section (101, 311) is configured to calculate the estimate value before update by weighted linear prediction on the time-series data of the observation values.

(Supplementary Note 4)

The estimation apparatus (20, 100) according to supplementary note 3, wherein
the prediction section (101, 311) is configured to execute the weighted linear prediction by using a weight that is larger as a time is closer to a current term.

(Supplementary Note 5)

The estimation apparatus (20, 100) according to any one of supplementary notes 2 to 4, wherein
the prediction section (101, 311) is configured to calculate an error covariance before update in addition to the estimate value before update, and
the update section (102, 312) is configured to calculate a Kalman gain, an estimate value after update, and an error covariance after update by using the estimate value before update and the error covariance before update.

(Supplementary Note 6)

The estimation apparatus (20, 100) according to supplementary note 5, further including a first variance value estimation section (313) configured to estimate a variance value of a modeling error on the basis of an input value for an actuator included in the target to be controlled, the input value being acquired from the actuator of the target to be controlled,
wherein the prediction section (101, 311) is configured to calculate the error covariance before update using the estimated variance value of the modeling error.

(Supplementary Note 7)

The estimation apparatus (20, 100) according to supplementary note 5 or 6, further including a second variance value estimation section (314) configured to estimate a variance value of an observation error on the basis of the time-series data of the observation values,
wherein the update section (102, 312) is configured to calculate the Kalman gain using the estimated variance value of the observation error.

(Supplementary Note 8)

The estimation apparatus (20, 100) according to supplementary note 7, further including a storage section (303) configured to store the time-series data of the observation values,
wherein the second variance value estimation section (314) is configured to estimate the variance value of the observation error in real time from the time-series data of the observation values accumulated in the storage section (303).

(Supplementary Note 9)

The estimation apparatus (20, 100) according to any one of supplementary notes 5 to 8, further including an abnormal value correction section (315) configured to determine whether or not the observation value of a current term is an abnormal value and correct the observation value determined as an abnormal value, on the basis of at least the estimate value before update and the observation value of the current term.

(Supplementary Note 10)

The estimation apparatus (20, 100) according to supplementary note 9, wherein the update section (102, 312) is configured to calculate the estimate value after update using the corrected observation value.

(Supplementary Note 11)

The estimation apparatus (20, 100) according to supplementary note 9 or 10, wherein the abnormal value correction section (315) is configured to calculate a first absolute value of a difference between the estimate value before update and the observation value of the current term, and not correct the observation value of the current term when the first absolute value is equal to or less than a predetermined threshold.

(Supplementary Note 12)

The estimation apparatus (20, 100) according to supplementary note 11, wherein the abnormal value correction section (315) is configured to correct the observation value of the current term to be equal to the estimate value before update when the first absolute value is larger than the predetermined threshold.

(Supplementary Note 13)

The estimation apparatus (20, 100) according to supplementary note 9 or 10, wherein the abnormal value correction section (315) is configured to
calculate a first absolute value of a difference between the estimate value before update and the observation value of the current term, and a second absolute value of a difference between the estimate value before update of a previous term and the observation value of the current term,
select any larger one of the first and second absolute values, and
correct the observation value of the current term on the basis of a result of threshold processing on the selected absolute value and a magnitude relationship between the first and second absolute values.

(Supplementary Note 14)

The estimation apparatus (20, 100) according to supplementary note 13, wherein the abnormal value correction section (315) is configured to not correct the observation value of the current term when the selected absolute value is equal to or less than a predetermined threshold.

(Supplementary Note 15)

The estimation apparatus (20, 100) according to supplementary note 14, wherein the abnormal value correction section (315) is configured to correct the observation value of the current term to be equal to the estimate value before update when the selected absolute value is larger than the predetermined threshold and the first absolute value is less than the second absolute value.

(Supplementary Note 16)

The estimation apparatus (20, 100) according to supplementary note 14 or 15, wherein the abnormal value correction section (315) is configured to correct the observation value of the current term to be equal to the estimate value after update of a previous term when the selected absolute value is larger than the predetermined threshold and the first absolute value is equal to or larger than the second absolute value.

(Supplementary Note 17)

The estimation apparatus (20, 100) according to any one of supplementary notes 5 to 16, further including a communication control section configured to acquire the observation value acquired by the sensor (11) from the target to be controlled, and output the estimate value after update to the target to be controlled.

(Supplementary Note 18)

A control system including:
means (202) for controlling a sensor (11);
means (101, 311) for calculating an estimate value before update relating to a state of a target to be controlled by executing linear prediction on time-series data, which includes observation values acquired from the sensor (11);
means (102, 312) for updating the estimate value before update by using an observation value acquired from the sensor (11); and
means (203) for controlling an actuator by using the updated estimate value.

(Supplementary Note 19)

An estimation method in an estimation apparatus (20, 100), the estimation method including:
calculating an estimate value before update relating to a state of a target to be controlled by executing linear prediction on time-series data, which includes observation values acquired from a sensor (11) attached to the target to be controlled; and
updating the estimate value before update by using an observation value acquired from the sensor (11).

(Supplementary Note 20)

A program causing a computer (21) mounted on an estimation apparatus (20, 100) to execute:
processing of executing linear prediction on time-series data, which includes observation values acquired from a sensor (11) attached to a target to be controlled, to calculate an estimate value before update relating to a state of the target to be controlled; and
processing of updating the estimate value before update by using an observation value acquired from the sensor (11).

Each of the configurations of supplementary notes 18 to 20 can be developed into any one of the configurations of supplementary notes 2 to 17 in the same way as in the case of supplementary note 1.

Note that the disclosures of the cited literatures in the citation list are incorporated by reference. Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

REFERENCE SIGNS LIST

10 Construction Machine
11 Sensor
20, 100 Estimation Apparatus
21 Processor
22 Memory
23 Input/Output Interface
24 Communication Interface
30 Prediction Apparatus
40 Update Apparatus
101, 311 Prediction Section
102, 312 Update Section
201, 301 Communication Control Section
202 Sensor Control Section
203 Actuator Control Section
302 Estimation Section
303 Storage Section
313 First Variance Value Estimation Section
314 Second Variance Value Estimation Section
315 Abnormal Value Correction Section

What is claimed is:

1. An estimation apparatus comprising:
a memory storing instructions; and
one or more processors configured to execute the instructions to, at each of a plurality of times:
before updating an estimate value relating to a state of a target to be controlled,
execute linear prediction on time-series data, which includes observation values acquired from a sensor attached to a target to be controlled, to calculate the estimate value;
calculate an error covariance at a current time based on the error variance calculated after updating the estimate value at a prior time;
calculate a Kalman gain by using the error covariance at the current time calculated before updating the estimate value;
update the estimate value by using the update value before updating, an observation value acquired from the sensor, and the Kalman gain calculated before updating;
after updating the estimate value relating to the state of the target to be controlled,
recalculate the error covariance at the current time by using the error covariance at the current time calculated before updating the estimate value and the Kalman gain; and
control an actuator by using the estimate value.

2. The apparatus according to claim 1, wherein
the one or more processors are configured to calculate the estimate value by executing weighted linear prediction on the time-series data of the observation values.

3. The apparatus according to claim 1, wherein
the memory stores the time-series data of the observation values, and
the one or more processors are configured to
estimate a variance value of observation errors on the basis of the time-series data of the observation values, wherein
the variance value of the observation errors is estimated in real time from the time-series data of the observation values as stored in the memory.

4. The apparatus according to claim 1, wherein
the one or more processors are configured to, for each observation value, determine whether or not the observation value is an abnormal value and correct the observation value determined as the abnormal value, on the basis of at least the estimate value and the observation value.

5. The apparatus according to claim 4, wherein
the one or more processors are configured to, for each observation value, calculate a first absolute value of a difference between the estimate value and the observation value of a current term, and not correct the observation value of the current term when the first absolute value is equal to or less than a predetermined threshold.

6. A system comprising:
a sensor attached to a target to be controlled;
an actuator;
a memory storing instructions; and
one or more processors configured to execute the instructions to, at each of a plurality of times:
    before updating an estimate value relating to a state of the,
        execute linear prediction on time-series data, which includes observation values acquired from the sensor, to calculate the estimate value;
        calculate an error covariance at a current time based on the error variance calculated after updating the estimate value at a prior time;
        calculate a Kalman gain by using the error covariance at the current time calculated before updating the estimate value;
        update the estimate value by using the update value before updating, an observation value acquired from the sensor, and the Kalman gain calculated before updating;
    after updating the estimate value relating to the state of the target to be controlled,
        recalculate the error covariance at the current time by using the error covariance at the current time calculated before updating the estimate value and the Kalman gain; and
        control the actuator by using the estimate value.

7. The control system according to claim 6, wherein
the one or more processors are configured to calculate the estimate value by executing weighted linear prediction on the time-series data of the observation values.

8. The control system according to claim 6, wherein
the memory to stores the time-series data of the observation values, and
the one or more processors are configured to
    estimate a variance value of observation errors on the basis of the time-series data of the observation values, wherein
    the variance value of the observation errors is estimated in real time from the time-series data of the observation values in as stored in the memory.

9. The system according to claim 6, wherein
the one or more processors are configured to, for each observation value, determine whether or not the observation value is an abnormal value and correct the observation value determined as the abnormal value, on the basis of at least the estimate value and the observation value.

10. The system according to claim 9, wherein
the one or more processors are configured to, for each observation value, calculate a first absolute value of a difference between the estimate value and the observation value of a current term, and not correct the observation value of the current term when the first absolute value is equal to or less than a predetermined threshold.

11. An method performed by a processor and comprising, each of a plurality of times:
    before updating an estimate value relating to a state of a target to be controlled,
        executing linear prediction on time-series data, which includes observation values acquired from a sensor attached to a target to be controlled, to calculate the estimate value;
        calculating an error covariance at a current time based on the error variance calculated after updating the estimate value at a prior time;
        calculating a Kalman gain by using the error covariance at the current time calculated before updating the estimate value;
        updating the estimate value by using the update value before updating, an observation value acquired from the sensor, and the Kalman gain calculated before updating;
    after updating the estimate value relating to the state of the target to be controlled,
        recalculating the error covariance at the current time by using the error covariance at the current time calculated before updating the estimate value and the Kalman gain; and
        controlling an actuator by using the estimate value.

12. The method according to claim 11, comprising
calculating the estimate value by executing weighted linear prediction on the time-series data of the observation values.

13. The method according to claim 11, further comprising:
storing the time-series data of the observation values; and
estimating a variance value of observation errors on the basis of the time-series data of the observation values, wherein
the variance value of the observation errors is estimated in real time the variance value of the observation errors from the time-series data of the observation values as stored.

14. The method according to claim 11, further comprising:
determining, for each observation value, whether or not the observation value of a current term is an abnormal value and correcting the observation value determined as the abnormal value, on the basis of at least the estimate value and the observation value of the current term.

15. The method according to claim 14, comprising
calculating, for each observation value, an absolute value of a difference between the estimate value and the observation value of the current term, and not correcting the observation value of the current term when the absolute value is equal to or less than a predetermined threshold.

* * * * *